(12) United States Patent (10) Patent No.: US 9,728,016 B2
Kumar et al. (45) Date of Patent: Aug. 8, 2017

(54) WHEEL MONITORING SYSTEM AND METHOD

(71) Applicant: General Electric Company, Schenectady, NY (US)

(72) Inventors: Ajith Kuttannair Kumar, Erie, PA (US); Bret Dwayne Worden, Erie, PA (US); Jeffrey David Willis, Lawrence Park, PA (US); Jeffrey Paul Moffett, Erie, PA (US); Mark Alan Pfingsten, Erie, PA (US); Steven Joseph Ehret, Erie, PA (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 14/547,662

(22) Filed: Nov. 19, 2014

(65) Prior Publication Data

US 2015/0193992 A1   Jul. 9, 2015

Related U.S. Application Data

(60) Provisional application No. 61/923,802, filed on Jan. 6, 2014.

(51) Int. Cl.
*G07C 5/08* (2006.01)
*G01M 17/10* (2006.01)
*B61K 9/12* (2006.01)

(52) U.S. Cl.
CPC .............. *G07C 5/0808* (2013.01); *B61K 9/12* (2013.01); *G01M 17/10* (2013.01)

(58) Field of Classification Search
CPC ....................................................... B61K 9/12
See application file for complete search history.

(56) References Cited

U.S. PATENT DOCUMENTS

| 2,574,474 A | 11/1951 | Gieskieng |
| 2,590,603 A | 3/1952 | Gieskieng |

(Continued)

FOREIGN PATENT DOCUMENTS

| CN | 1446160 A | 10/2003 |
| DE | 19827271 A1 | 12/1999 |

(Continued)

OTHER PUBLICATIONS

Han et al., A Study on Mechanical Characteristics for Induction Motor of Rolling Stock, Oct. 18-21, 2006, SICE-ICASE International Joint Conference, Bexco, Busan, Korea, pp. 718-721.

(Continued)

*Primary Examiner* — Redhwan K Mawari
*Assistant Examiner* — Michael Whalen
(74) *Attorney, Agent, or Firm* — Global Patent Operation; John A. Kramer

(57) ABSTRACT

Systems and methods for monitoring a vehicle determine a baseline wheel rotational speed and wheel rotational speeds of a wheel for different positions along an outer perimeter of the wheel. One or more deviations between the wheel rotational speeds and the baseline wheel rotational speed are determined, and the deviations between the wheel rotational speeds and the baseline wheel rotational speed are correlated with one or more identified positions of the positions along the outer perimeter of the wheel. One or more of damage to the wheel or damage to a drivetrain of the vehicle is identified based at least in part on the one or more deviations being correlated with the one or more identified positions.

20 Claims, 11 Drawing Sheets

(56) References Cited

U.S. PATENT DOCUMENTS

| | | | |
|---|---|---|---|
| 2,605,392 A | 7/1952 | Gieskieng | |
| 3,558,876 A | 1/1971 | Glazar et al. | |
| 3,844,513 A | 10/1974 | Bernhardson et al. | |
| 4,058,279 A | 11/1977 | Frielinghaus | |
| 4,129,276 A | 12/1978 | Svet | |
| 4,161,730 A | 7/1979 | Anderson | |
| 4,161,734 A | 7/1979 | Anderson | |
| 4,702,104 A | 10/1987 | Hallberg | |
| 4,781,060 A | 11/1988 | Berndt | |
| 5,133,521 A | 7/1992 | Gutauskas | |
| 5,433,111 A | 7/1995 | Hershey et al. | |
| 5,577,690 A * | 11/1996 | Haddox | B61K 9/12 246/169 R |
| 5,726,905 A | 3/1998 | Yazici et al. | |
| 5,743,495 A | 4/1998 | Welles, II et al. | |
| 5,816,358 A | 10/1998 | Adler et al. | |
| 6,035,265 A | 3/2000 | Dister et al. | |
| 6,209,672 B1 | 4/2001 | Severinsky | |
| 6,287,009 B1 | 9/2001 | Nakamura et al. | |
| 6,371,417 B1 | 4/2002 | Southon | |
| 6,496,782 B1 | 12/2002 | Claus et al. | |
| 6,727,725 B2 | 4/2004 | Devaney et al. | |
| 7,184,930 B2 | 2/2007 | Miyasaka et al. | |
| 7,696,446 B2 | 4/2010 | Yeh et al. | |
| 7,993,091 B2 | 8/2011 | Osanai et al. | |
| 2003/0160133 A1 | 8/2003 | Moretti et al. | |
| 2004/0130618 A1 | 7/2004 | Kilian | |
| 2004/0231897 A1 | 11/2004 | Kimura et al. | |
| 2006/0196064 A1* | 9/2006 | Heimann | G01M 17/10 33/550 |
| 2008/0033695 A1* | 2/2008 | Sahara | G01H 1/003 702/185 |
| 2008/0192113 A1 | 8/2008 | Kilian | |
| 2010/0063660 A1 | 3/2010 | Uchida | |
| 2010/0169030 A1 | 7/2010 | Parlos | |

FOREIGN PATENT DOCUMENTS

| | | |
|---|---|---|
| EP | 0227661 A1 | 7/1987 |
| EP | 0667526 A1 | 8/1995 |
| EP | 0940682 A1 | 9/1999 |
| EP | 1017577 A1 | 7/2000 |
| EP | 1132735 A1 | 9/2001 |
| EP | 1212228 A1 | 6/2002 |
| EP | 1292479 A1 | 3/2003 |
| EP | 1324047 A2 | 7/2003 |
| EP | 1485676 A1 | 12/2004 |
| EP | 1559625 A1 | 8/2005 |
| EP | 1600351 A1 | 11/2005 |
| EP | 2208041 A1 | 7/2010 |
| WO | 8601167 A1 | 2/1986 |
| WO | 9530886 A1 | 11/1995 |
| WO | 9911497 A1 | 3/1999 |
| WO | 0194175 A1 | 12/2001 |
| WO | 02097365 A1 | 12/2002 |
| WO | 2009054566 A1 | 4/2009 |
| WO | 2013092956 A2 | 6/2013 |

OTHER PUBLICATIONS

Andrea Stefani, Induction Motor Diagnosis in Variable Speed Drives, Mar. 2010, Ph.D. thesis, Department of Electrical Engineering, University of Bologna, 132 pp.

Blodt et al., Mechanical Fault Detection in Induction Motor Drives Through Stator Current Monitoring—Theory and Application Examples, May 21, 2010, 37 pp.

Mounir Djeddi, Pierre Granjon, and Benoit Leprettre, Bearing Fault Diagnosis in Induction Machine Based on Current Analysis Using High-Resolution Technique, IEEE. 2007.

Pratesh Jayaswal, A.K. Wadhwani, and K.B. Mulchandani. Machine Fault Signature Analysis, International Journal of Rotating Machinery vol. 2008 (2008), Article ID 583982, 10 pages, Hindawi Publishing Corporation.

Royo, J. Segui, R. Pardina, A. Nevot, S. Arcega, F.J., Machine current signature analysis as a way for fault detection in permanent magnet motors in elevators, IEEE, Sep. 6-9, 2008; pp. 1-6.

* cited by examiner

WHEEL MONITORING SYSTEM AND METHOD

CROSS-REFERENCE TO RELATED APPLICATIONS

This application claims priority to U.S. Provisional Application No. 61/923,802, which was filed on 6 Jan. 2014, and the entire disclosure of which is incorporated by reference herein in its entirety.

FIELD

Embodiments of the inventive subject matter described herein relate to monitoring a wheel and/or drivetrain of a vehicle.

BACKGROUND

Rigid wheels of vehicles can develop defects, such as flat spots or segments along the portion of the wheel that rolls along a surface, shells, spalls, scrapes, dents, gouges, grooves, and the like. These types of defects can be referred to as wheel visual damage. These types of damage can be created by wear and tear of the wheel, such as wearing down of the wheel when the wheel is sliding along the surface. For example, the wheels of a rail vehicle can develop flat spots over time due to wearing down of the wheel by the rails on which the rail vehicle travels. Additionally, bearings in motors that rotate the wheels, axle journals that couple wheels to axles, or other components of a drivetrain of a vehicle can become worn down and/or damaged over time.

If severe enough, these types of damage can pose a hazard for the vehicle. For example, the damage can generate vibratory forces when the wheels rotate along a route, and the forces can damage components of the vehicle. In order to detect the damage, human operators may visually inspect the vehicle when the vehicle is stopped. But, this type of inspection is subject to human error, can be time consuming, and generally can only be performed when the vehicle is not moving. Some sections of tracks for rail vehicles include strain gauges built into the rails. When a rail vehicle having damage in a wheel travels over the strain gauges, the strain gauges can detect the increased amount of force or vibration generated by the damage. But, this type of detection can be limited due to the need for the rail vehicle to travel to the location of track where the strain gauges are located.

Additionally, bearings in motors that rotate the wheels, axle journals that couple wheels to axles, or other components of a drivetrain of a vehicle can become worn down and/or damaged over time. If severe enough, these problems can pose a hazard for the vehicle. In order to detect these problems, however, typically operators may inspect the vehicle when the vehicle is stopped. But, this type of inspection also is subject to human error, can be time consuming, and generally can only be performed when the vehicle is not moving.

BRIEF DESCRIPTION

In one embodiment, a method (e.g., for monitoring a vehicle) includes determining a baseline wheel rotational speed and wheel rotational speeds of a wheel of a vehicle for different positions along an outer perimeter of the wheel that contact a surface of a route, identifying one or more deviations between the wheel rotational speeds and the baseline wheel rotational speed, correlating the one or more deviations between the wheel rotational speeds and the baseline wheel rotational speed with one or more identified positions of the positions along the outer perimeter of the wheel, and identifying one or more of damage to the wheel or damage to a drivetrain of the vehicle based at least in part on the one or more deviations being correlated with the one or more identified positions.

In another embodiment, a system (e.g., an analysis system of a vehicle) includes one or more processors configured to determine a baseline wheel rotational speed and wheel rotational speeds of a wheel of a vehicle for different positions along an outer perimeter of the wheel that contact a surface of a route. The one or more processors also can be configured to identify one or more deviations between the wheel rotational speeds and the baseline wheel rotational speed, and to correlate the one or more deviations between the wheel rotational speeds and the baseline wheel rotational speed with one or more identified positions of the positions along the outer perimeter of the wheel. The one or more processors also can be configured to identify one or more of damage to the wheel or damage to a drivetrain of the vehicle based at least in part on the one or more deviations being correlated with the one or more identified positions.

In another embodiment, a method (e.g., for monitoring a vehicle) includes determining rotational speeds of a wheel during movement of a vehicle that includes the wheel along a route, determining locations along the wheel that contact the route and that correspond to the rotational speeds that are measured, determining deviations in the rotational speeds of the wheel that exceed a baseline rotational speed of the wheel, determining one or more groups of the locations along the wheel that correspond with the deviations in the rotational speeds of the wheel, and determining damage to one or more of the wheel, a flat portion of the wheel, or damage to a drivetrain of the vehicle based at least in part at least one of the groups of the locations including at least a designated, non-zero threshold number of the locations along the wheel that correspond with the deviations in the rotational speeds of the wheel.

BRIEF DESCRIPTION OF THE DRAWINGS

Reference is now made briefly to the accompanying drawings, in which.

DETAILED DESCRIPTION

Figure 1:
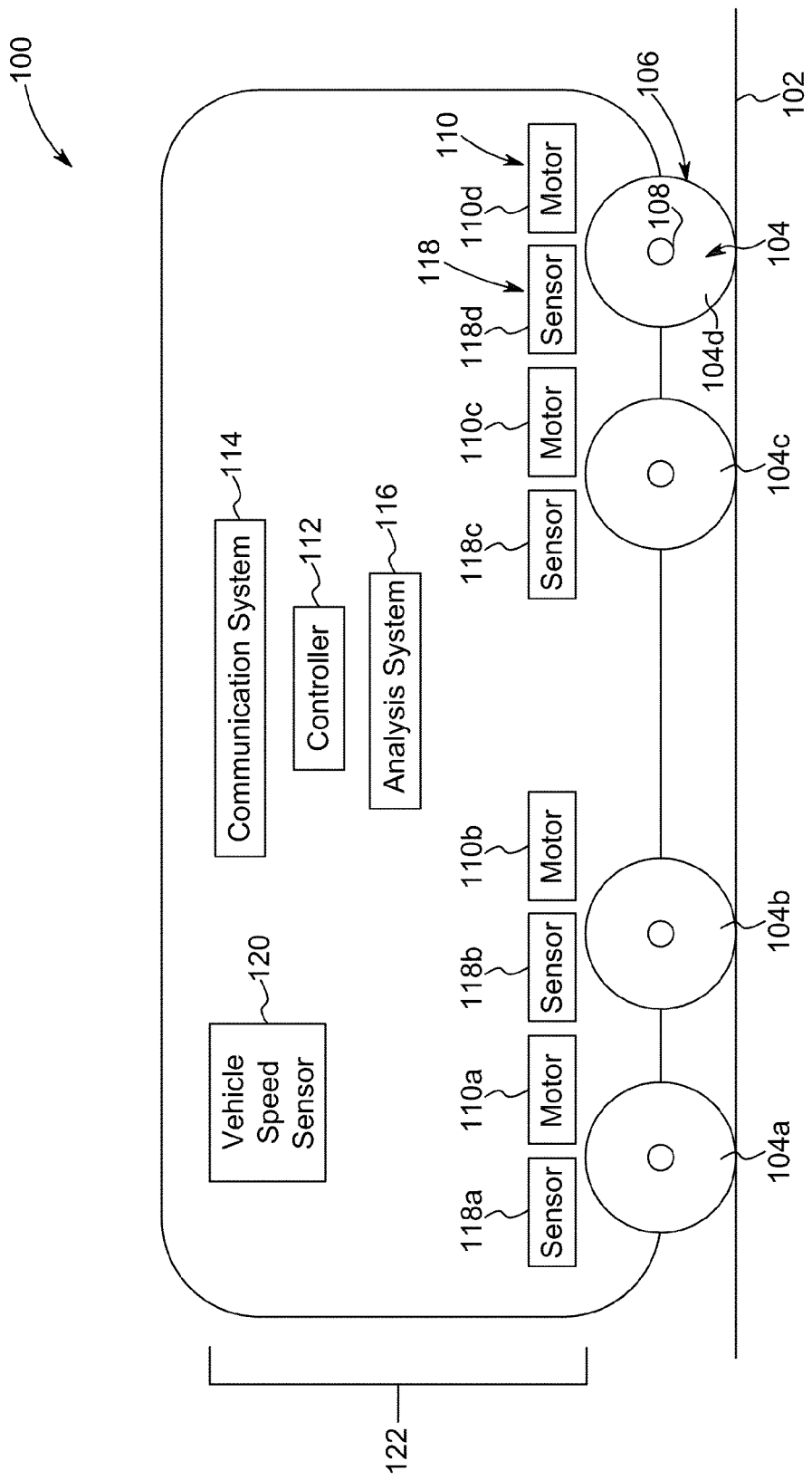
FIG. 1 is a schematic illustration of a monitoring system of a vehicle in accordance with one example of the inventive subject matter described herein.

One or more embodiments of the inventive subject matter described herein include monitoring systems and methods that monitor speeds of one or more wheels of a vehicle and, based on changes in the speeds of the one or more wheels, identify damage to the one or more wheels and/or drivetrain of the vehicle. The damage can include visual wheel damage, which can include damage such as flat portions along the outer perimeter of one or more of the wheels, shells, spalls, scrapes, dents, gouges, grooves, or the like. The damage optionally can include damage to a drivetrain of the vehicle, such as (but not limited to) damaged bearings of a motor, damaged axle journals, damaged gears, or the like.

In one example of damage to wheels, the wheels may be initially or previously round, rigid wheels (e.g., wheels that are forged, cast, or otherwise formed from one or more metals and/or metal alloys) that develop segments along an outer perimeter of the wheels (e.g., along the portion of the wheel that contacts the route being traveled upon) that are no longer round. For example, these segments may be considered "flat" or "out-of-round" when one or more portions of the perimeter of the wheel have a larger radius than a previous or initial radius of the wheel, and/or when the one or more portions of the perimeter of the wheel are flat instead of rounded.

In one example of the inventive subject matter, damage to wheels and/or a drivetrain can be identified with one or more onboard or off-board systems by determining a speed signature of the wheel in a frequency domain that includes at least one of a once-per-revolution or harmonic frequencies of the wheel having increased amounts of variation in speeds of the wheel. In another example, the damage can be identified by determining a speed signature of the examined wheel that represents the examined wheel spinning faster than one or more other wheels of the vehicle or spinning faster than a calculated speed of the examined wheel. The calculated speed of the examined wheel can be calculated from a previously measured diameter or radius of the examined wheel.

In another example of the inventive subject matter described herein, the damage can be detected by measuring accelerations or vibrations in the examined wheel that exceed one or more designated accelerations or vibrations of the examined wheel. In another example, the damage is identified by monitoring at least one of vibration or impact acceleration of the examined wheel using a radio frequency identification (RFID) tag mounted to a combination of the examined wheel and a traction motor that generates tractive effort to rotate the examined wheel. An alert can be communicated (e.g., to an onboard operator of the vehicle, to an off-board location, or elsewhere) when the at least one of the vibration or impact acceleration of the examined wheel exceeds a designated threshold.

Optionally, one or more alerts can be communicated to an off-board location to notify of the damage. This notification can be used to notify an upcoming repair or maintenance facility to prepare for replacement or repair of the wheels and/or drivetrain having the damage upon arrival (or relatively soon thereafter) of the vehicle at the facility.

FIG. 1 is a schematic illustration of a monitoring system 122 of a vehicle 100 in accordance with one example of the inventive subject matter described herein. The vehicle 100 can represent a propulsion-generating vehicle system that generates tractive effort to propel the vehicle 100 along a route 102. In one example, the vehicle 100 may be a rail vehicle such as a locomotive, but alternatively may be another type of vehicle system. For example, the vehicle 100 may be another type of off-highway vehicle (e.g., a vehicle that is not designed and/or not permitted to travel on public roadways), or may be an automobile. The vehicle 100 includes several wheels 104 (e.g., wheels 104a-d) having outer perimeters 106 that engage the route 102 when the vehicle 100 travels along the route 102. With respect to rail vehicles, the wheels 104 may be rigid wheels having outer perimeters 106 that contact rails of a track. The number and arrangement of the wheels 104 can vary from that shown in FIG. 1.

The wheels 104 can be connected to axles 108 that are rotated by motors 110 (e.g., motors 110a-d) to rotate the wheels 104 and cause propulsion of the vehicle 100. Although not shown in FIG. 1, the motors 110 can be separately connected to individual ones of the axles 108 by gears, pinions, and the like, or one or more of the motors 110 may be connected to two or more of the axles 108.

A controller 112 of the vehicle 100 communicates with the motors 110 to control a linear speed at which the vehicle 100 moves along the route 102. The controller 112 includes or represents one or more hardware circuits or circuitry that includes or is connected with one or more processors, microcontrollers, or other electronic logic-based devices that perform operations described herein. The controller 112 can include or be connected with one or more operator input devices, such as levers, pedals, switches, touchscreens, or the like, to receive input from an onboard operator that controls movement of the vehicle 100. Optionally, the controller 112 can automatically control movement of the vehicle 100, such as according to a trip plan that dictates operational settings of the vehicle 100 (e.g., speeds, throttle positions, brake settings, power output, or the like). In one aspect, the controller 112 can control movement of the vehicle 100 according to signals received from an off-board location via a communication system 114. For example, the communication system 114 may receive communication signals through one or more wired and/or wireless connections, where the signals dictate operational settings of the vehicle 100.

The communication system 114 includes transceiver hardware and/or circuitry that can communicate signals with one or more other communication devices. The communication system 114 can include an antenna that wirelessly communicates (e.g., transmits, broadcasts, and/or receives) signals and/or the communication system 114 can be coupled with one or more conductive pathways (e.g., cables, catenaries, rails, or the like) to communicate signals through the conductive pathways.

The monitoring system 122 includes one or more rotational speed sensors 118 (e.g., speed sensors 118a-d), a vehicle speed sensor 120, and an analysis system 116. The analysis system 116 examines rotational speeds of the wheels 104 and/or the speed at which the vehicle 100 is moving in order to identify damage to the wheels 104 and/or drivetrain of the vehicle, as described below. The description herein focuses on the identification of flat portions on the wheels 104, but not all embodiments are limited to identifying flat portions as the damage. The same or similar analyses described herein may be used to identify damaged surfaces of the wheels (other than flat portions), damaged bearings, damaged axle journals, or other types of damage to the wheels 104 and/or drivetrain. For example, in addition or as an alternate to identifying a flat portion, the data examined by one or more of the analyses described herein to identify a flat portion optionally may identify damaged bearings, damaged axle journals, or the like.

The analysis system 116 includes or represents one or more hardware circuits or circuitry that includes or is connected with one or more processors, microcontrollers, or other electronic logic-based devices that perform operations described herein. The analysis system 116 can communicate signals with the communication system 114 in order to receive information from off-board the vehicle 100 and/or to communicate information (e.g., identifications of damage to wheels 104 and/or a drivetrain of the vehicle) to one or more off-board locations. For example, in response to identifying damage to a wheel 104, the communication system 114 may notify one or more upcoming repair or maintenance facilities along the direction of travel of the vehicle 100 of the need to schedule further inspection and/or replacement of the wheel 104 and/or drivetrain (e.g., engine, motor, shaft, gears, axles, or the like, that transfer rotary motion generated by the engine of the vehicle into rotation of the wheels 104) having the damaged portion. Optionally, the analysis system 116 can communicate (via the communication system 114) with a scheduling facility to notify the facility of the damaged portion of the wheel 104 and/or drivetrain, and the need to slow down or stop movement of the vehicle 100. The scheduling facility can use this notification to adjust the schedules of one or more other vehicles.

The analysis system 116 can receive speed data from the rotational speed sensors 118 (e.g., sensors 118a-d). The speed sensors 118 can include tachometers or other devices that measure how rapidly the wheels 104 are rotating during movement of the vehicle 100. The speed sensors 118 can be coupled with the motor that rotates one or more shafts, gears, or the like, to rotate wheels of the vehicle. The speed sensors 118 can output signal pulses at a frequency that is representative of and/or based on the rotational speed of the wheel 104. For example, for faster rotational speeds, the pulses may be communicated at a faster rate relative to slower rotational speeds. Alternatively, the speed sensors 118 can be coupled with the wheels, the axles, the gears, or another component of the vehicle. The vehicle speed sensor 120 can include a global positioning system (GPS) receiver, other wireless receiver, or other device, that determines how fast the vehicle 100 is moving along the route 102. This speed can be reported to the analysis system 116 as the vehicle speed. As described below, the analysis system 116 can use the rotational speeds and/or vehicle speeds, and/or changes in one or more of these speeds, to identify wheels 104 in the vehicle 100 that have damaged portions (shown in FIG. 2) and/or a damaged drivetrain. Optionally, the analysis system 116 can be positioned off-board the vehicle 100. For example, the rotational speeds of the wheels 104 and/or the vehicle speed can be communicated from the sensors 118, 120 to the off-board analysis system 116 for examination. These speeds may be recorded into a log that is kept onboard the vehicle 100 until the vehicle 100 arrives at a location, whereupon the analysis system 116 can then analyze the speeds.

Figure 2:
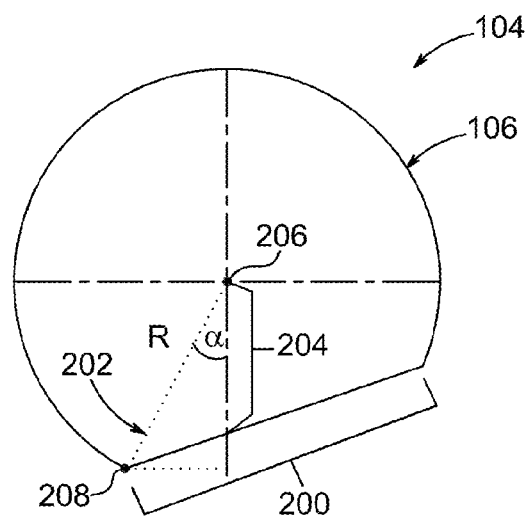
FIG. 2 is a schematic illustration of a wheel of the vehicle shown in FIG. 1.

With continued reference to the vehicle 100 shown in FIG. 1, FIG. 2 is a schematic illustration of one of the wheels 104 of the vehicle 100. The wheel 104 is shown in FIG. 2 as having a damaged portion 200 along (e.g., within) the outer perimeter 106 of the wheel 104. Optionally, the wheel 104 may have one or more additional damaged portions 200. The damaged portion 200 on the wheel 104 may not be as significant or large as shown in FIG. 2, or may be more significant or larger than is shown in FIG. 2. The damaged portion 200 shown in FIG. 2 may be exaggerated relative to what may actually occur.

The wheel 104 has a radius dimension 202 (also shown as "R" in the illustration of FIG. 2) between a center location 206 of the wheel 104 and an intersection location 208 along the outer perimeter 106 of the wheel 104. The intersection location 208 can represent one location where the damaged portion 200 of the wheel 104 meets a portion of the outer perimeter 106 of the wheel 104 that is outside of the damaged portion 200.

An instantaneous radius (IR) 204 of the wheel 104 represents the distance between the center location 206 of the wheel 104 and an interface between the wheel 104 and the route 102. When this interface is between the route 102 and the portions of the wheel 104 that are outside the damaged portion 200, the instantaneous radius (IR) 204 may be equal or substantially equal to the radius dimension 202. But, when the interface is between the route 102 and the damaged portion 200 of the wheel 104, the instantaneous radius (IR) 204 may be smaller than the radius dimension 202.

The instantaneous radius (IR) 204 may be approximated or calculated using the following:

$$IR = R * \cos(\alpha) \quad \text{(Equation \#1)}$$

where IR represents the instantaneous radius (IR) 204, R represents the radius dimension 202 of the wheel 104, and α represents the angle between the direction along which the distance dimension or instantaneous radius (IR) 204 is measured. Optionally, the instantaneous radius (IR) 204 may be calculated or approximated using another relationship.

When the damaged portion 200 of the wheel 104 contacts the route 102, the instantaneous radius (IR) 204 is shorter than the radius dimension 202 of the wheel 104. As a result, rotation of the wheel 104 will result in a change in the radius of the wheel 104 that contacts the route 102 due to a revolution of the damaged portion 200 on the route 102. This change in the instantaneous radius (IR) 204 can result in a change in the speed at which the wheel 104 rotates. For example, the wheel 104 shown in FIG. 2 may be rotating at a designated rotational speed to cause the vehicle 100 to move along the route 102 at a designated linear speed. When the damaged portion 200 of the wheel 104 engages the route 102, the rotation of the wheel 104 may briefly speed up. The changes in the speed at which the wheel 104 rotates can be monitored in order to identify damaged portions 200 on the wheel 104.

Figure 3:
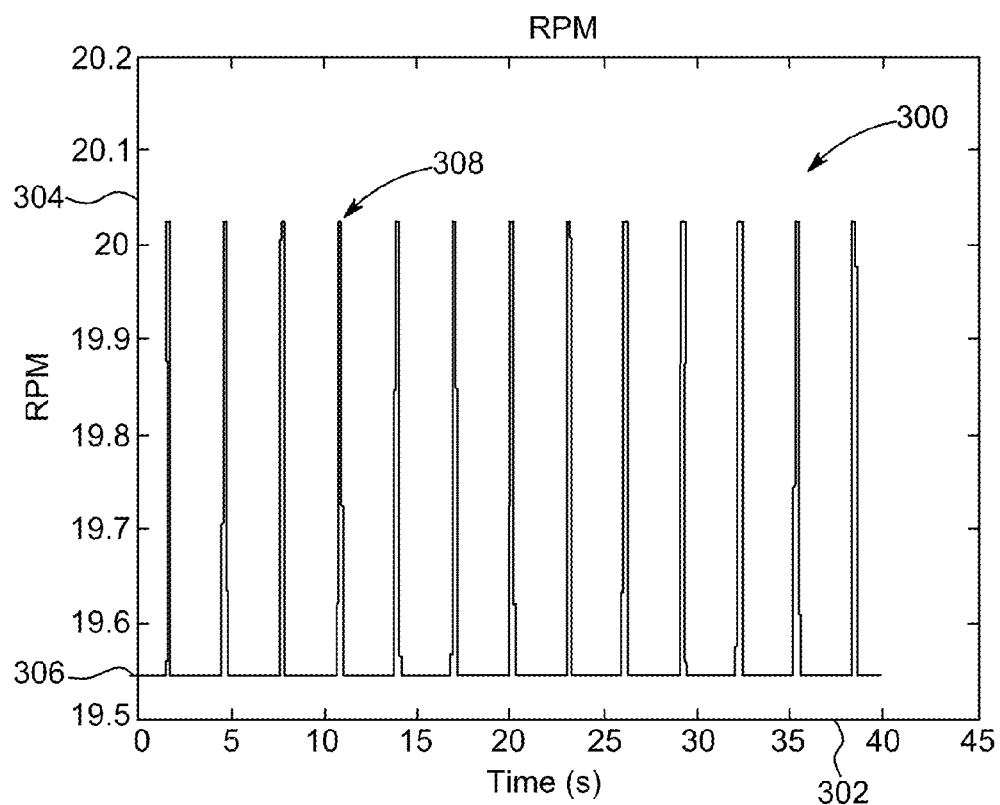
FIG. 3 illustrates a time domain speed signature of the wheel shown in FIG. 2 according to one example of the inventive subject matter.

FIG. 3 illustrates a time domain speed signature 300 of the wheel 104 shown in FIG. 2 according to one example of the inventive subject matter. The speed signature 300 is shown alongside a horizontal axis 302 representative of time and a vertical axis 304 representative of rotational speeds of the wheel 104 (e.g., revolutions per minute, or RPMs). The speed signature 300 represents how rapidly the wheel 104 is rotating during movement of the vehicle 100 (shown in FIG. 1) along the route 102 (shown in FIG. 1) with respect to time. For example, the speed signature 300 can represent the time domain of the rotational speeds of the wheel 104. One or more additional speed signatures 300 may be obtained for one or more other wheels 104. The analysis system 116 (shown in FIG. 1) can generate the speed signature 300 from the data collected by the speed sensors 118 (shown in FIG. 1).

As shown in the speed signature 300, the rotational speeds of the wheel 104 change over time. The rotational speeds are at or near a rotational speed 306 between periodically increasing at several peaks 308 of the speed signature 300. The rotational speed 306 may be based on the linear speed at which the vehicle 100 is moving along the route 102. For example, the rotational speed 306 may be derived from the speed at which the vehicle 100 is moving along the route 102. The analysis system 116 can use the speed signature 300 to determine that the wheel 104 has the damaged portion 200 and/or that a portion of the drivetrain of the vehicle is damaged. For example, the analysis system 116 can identify the peaks 308 due to the rapid and repeated increase in rotational speed of the wheel 104.

In one aspect, the analysis system 116 can compare the rotational speeds of two or more wheels 104 in the same vehicle 100 to determine if any of the wheels 104 demonstrate faster rotational speeds than one or more other wheels 104. For example, if the speed signature 300 for an examined wheel 104 has a peak 308 at the same time that a speed signature of another wheel 104 of the same vehicle 100 does not have a peak 308 (or has a slower rotational speed), then the analysis system 116 can determine that the examined wheel 104 has a damaged portion 200 and/or that the drivetrain of the vehicle 100 is damaged.

Additionally or alternatively, the analysis system 116 can compare the rotational speeds of the wheels 104 to a designated or calculated rotational speed to determine if one or more of the wheels 104 exhibit faster rotational speeds. For example, a designated or measured wheel size (e.g., diameter or other size) of one or more of the wheels 104 may be used along with the vehicle speed to calculate a designated rotational speed for the wheels 104. Designated rotational speeds for the vehicle 100 can be calculated by dividing the vehicle speeds by a circumference that is calculated using the designated or measured wheel size. The designated rotational speeds can be compared to the actual rotational speeds of the wheels 104 to determine if one or more of the wheels 104 has faster rotational speeds than the designated rotational speeds. For example, a wheel 104 that has faster rotational speeds on a periodic or other basis (e.g., the peaks 308) than the designated rotational speeds may be identified by the analysis system 116 as being a wheel 104 that has the damaged portion 200 and/or can be identified as indicating damage to the drivetrain of the vehicle 100.

The analysis system 116 can differentiate between the peaks 308 and changes in the speed of the vehicle 100 by comparing the speed signature 300 of one wheel 104 with one or more other wheels 104. If the speed signatures for two or more wheels 104 of the same vehicle 100 include peaks 308 that occur at or substantially at the same time, then the analysis system 116 can determine that the peaks 308 do not represent movement of a damaged portion of a wheel 104 on the route 102 and/or a damaged drivetrain. On the other hand, if the speed signature 300 for one wheel 104 includes periodic peaks 308 and the speed signature of one or more other wheels 104 does not, then the analysis system 116 can determine that the wheel 104 having the rotational speeds in the speed signature 300 having the peaks 308 has the damaged portion 200 and/or a damaged drivetrain. Optionally, the analysis system 116 can perform further analysis on the rotational speeds of the speed signature 300.

Figure 4:
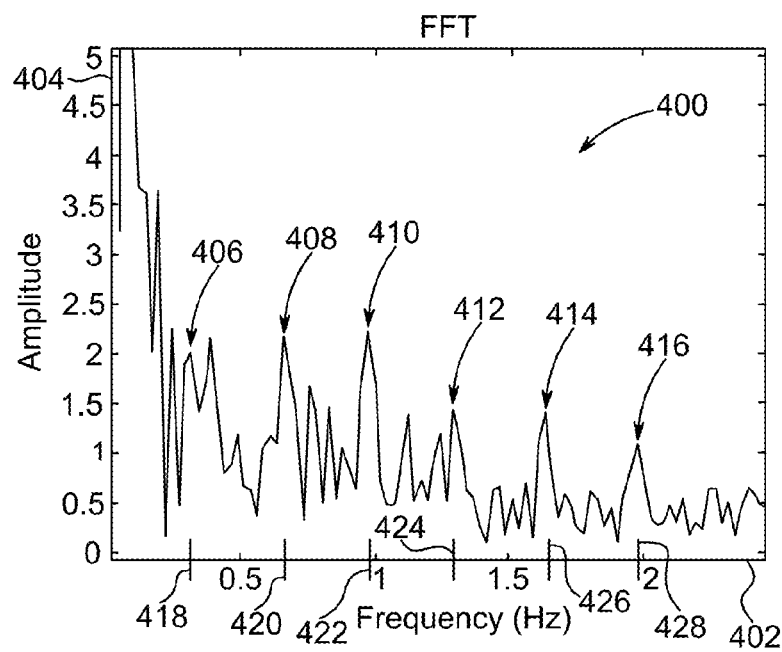
FIG. 4 illustrates a frequency domain speed signature of rotational speeds shown in the time domain speed signature of FIG. 3.

FIG. 4 illustrates a frequency domain speed signature 400 of the rotational speeds shown in the time domain speed signature 300 shown in FIG. 3. The speed signature 400 of FIG. 4 also can be referred to as a speed spectrum. The speed signature 400 is shown alongside a horizontal axis 402 representative of frequency (e.g., the rate at which the wheel 104 rotates) and a vertical axis 404 representative of amplitude (e.g., how often the wheel 104 rotates at the associated frequency).

The analysis system 116 (shown in FIG. 1) can generate the speed signature 400 from the rotational speeds of the wheel 104 that are measured by the speed sensor 118 (shown in FIG. 1) of that wheel 104. For example, the analysis system 116 can perform a fast Fourier transform or other calculation to generate the speed signature 400 from the measured rotational speeds of the wheel.

The analysis system 116 can examine the speed signature 400 to determine if one or more peaks 406, 408, 410, 412, 414, 416 are in the speed signature 400. In one aspect, the analysis system 116 can look for the peaks 406, 408, 410, 412, 414, 416 at or near frequencies associated with the moving speed of the vehicle 100. For example, the analysis system 116 can examine the speed signature 400 at one or more frequencies that are harmonic frequencies of the speed at which the vehicle 100 is moving along the route 102. The harmonic frequencies can be identified by calculating how rapidly the wheels 104 should be rotating at the actual vehicle speed. For example, the analysis system 116 can divide the vehicle speed by the circumference of the wheels 104 to determine how rapidly the wheels 104 are to rotate. The circumference of the wheels 104 can be a designated value or a measured value from a previous measurement of one or more of the wheels 104. The calculation of how often the wheels 104 are to rotate for the vehicle speed can be referred to as a fundamental frequency 418 of the wheels 104, and represents how rapidly the wheels 104 should be completing rotations as the wheels 104 roll along the route 102 based on the vehicle speed. In the illustrated example, the fundamental frequency 418 is approximately 0.32 hertz. As another example, the fundamental and/or harmonic frequencies may be determined by examining the speed at which the motor 110 rotates the wheel 104. For example, the rotation speed at which the motor 110 rotates or is commanded to rotate the wheel 104 may be used to calculate how often the wheel 104 completes a revolution, which can represent the fundamental frequency of the speed signature.

The analysis system 116 can examine the speed signature 400 at harmonic frequencies 420, 422, 424, 426, 428 of the fundamental frequency 418 (e.g., at integer multiples of the fundamental frequency) to determine if a peak 406, 408, 410, 412, 414, 416 is at or near those frequencies. For example, the analysis system 116 can look at the speed signature 400 at these harmonic frequencies to determine if the speed signature 400 rapidly increases and then decreases at or near the frequencies, if the speed signature 400 exceeds one or more previously designated thresholds at or near the frequencies, or otherwise identifies the peaks 406, 408, 410, 412, 414, 416. If one or more of the peaks 406, 408, 410, 412, 414, 416 are identified, then the analysis system 116 can identify the wheel 104 as having one or more damaged portions 200 and/or a damaged drivetrain. Optionally, the analysis system 116 can compare the speed signature 400 of one wheel 104 of the vehicle 100 with frequency domain speed signatures of one or more other wheels 104 of the same vehicle 100.

Figure 5:
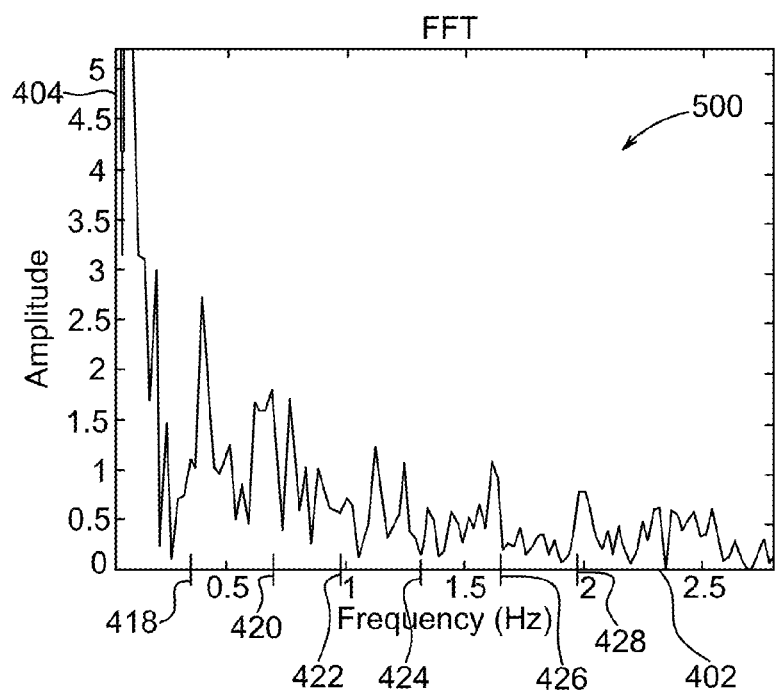
FIG. 5 illustrates another frequency domain speed signature of rotational speeds shown of another wheel of the same vehicle shown in FIG. 1 in accordance with one example.

With continued reference to the speed signature 400 shown in FIG. 4, FIG. 5 illustrates another frequency domain speed signature 500 of rotational speeds shown of another wheel 104 of the same vehicle 100 in accordance with one example. The speed signature 500 of FIG. 5 also can be referred to as a speed spectrum. The speed signature 500 is shown alongside the horizontal and vertical axes 402, 404 described above. The speed signature 500 can represent the rotational speeds of a wheel 104 that does not have the damaged portion 200 (referred to herein as a "round wheel") or damaged drivetrain, while the speed signature 400 shown in FIG. 4 can represent the rotational speeds of a wheel 104 of the same vehicle 100 that does have the damaged portion 200 or a damaged drivetrain.

As shown by a comparison of the speed signatures or spectra 400, 500, the speed signature 500 of the round wheel 104 does not include peaks at the fundamental and harmonic frequencies 418, 420, 422, 424, 426, 428, while the speed signature 400 of the wheel with the damaged portion 200 or with the damaged drivetrain does include peaks at these frequencies. The analysis system 116 can determine that the peaks are present in the signature 400 but not the signature 500 by comparing the magnitudes of the signatures 400, 500 at the fundamental and harmonic frequencies 418, 420, 422, 424, 426, 428. The magnitudes of the speed signature 400 for the wheel 104 having the damaged portion 200 or for the damaged drivetrain at the fundamental and harmonic frequencies 418, 420, 422, 424, 426, 428 are larger than the magnitudes of the speed signature 500 for the wheel 104 or the drivetrain that is not damaged at the corresponding fundamental and harmonic frequencies 418, 420, 422, 424, 426, 428. Additionally, the speed signature 500 of the wheel 104 or drivetrain that is not damaged does not include peaks (e.g., relatively rapid increases followed by relatively rapid decreases) at the corresponding fundamental and harmonic frequencies 418, 420, 422, 424, 426, 428.

The analysis system 116 can compare the speed signatures or spectra for two or more wheels 104 of the same vehicle 100 and determine which of the signatures or spectra have peaks at the fundamental and harmonic frequencies 418, 420, 422, 424, 426, 428. The analysis system 116 can identify the wheels 104 having signatures or spectra with peaks at one or more of the fundamental and harmonic frequencies 418, 420, 422, 424, 426, 428 as being wheels 104 that have one or more damaged portions 200 and/or representative of a damaged drivetrain.

Additionally or alternatively, the analysis system 116 can examine accelerations, such as vibrations or changes in rotational speeds of the wheels 104, to determine when one or more of the wheels 104 has the damaged portion 200 and/or when the drivetrain is damaged.

Figure 6:
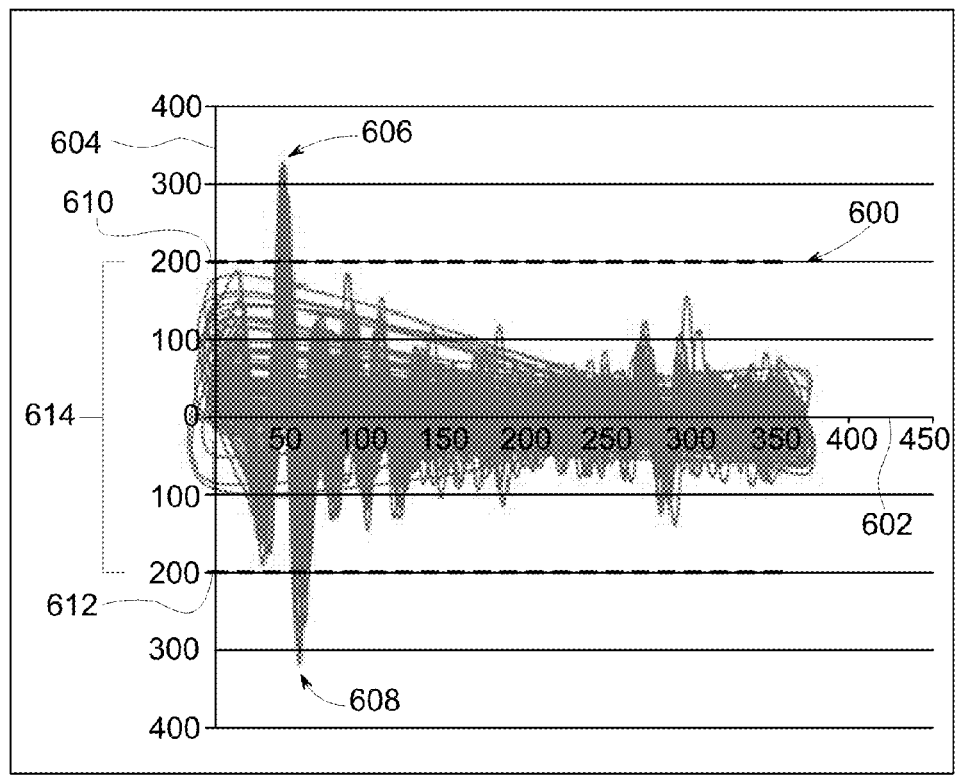
FIG. 6 illustrates a spatial domain speed signature of a wheel of the vehicle shown in FIG. 1 in accordance with one example of the inventive subject matter described herein.

FIG. 6 illustrates a spatial domain speed signature 600 of a wheel 104 of the vehicle 100 in accordance with one example of the inventive subject matter described herein. The speed signature 600 represents accelerations (e.g., changes in the rotational speeds of the wheel 104) of different locations along the outer perimeter 106 (shown in FIG. 1) of the wheel 104. The speed signature 600 is shown alongside a horizontal axis 602 representative of wheel location (as described below) and a vertical axis 604 representative of acceleration. In contrast to the time- and frequency-domain speed signatures 300, 400, 500 of FIGS. 3 through 5, the speed signature 600 can be referred to as a spatial domain speed signature 600 because the speeds (e.g., accelerations) of the wheel 104 are shown in the speed signature 600 based on which portion of the outer perimeter 106 of the wheel 104 was contacting the route 102 when the speeds (e.g., accelerations) were measured.

The positions along the outer perimeter 106 of the wheel 104 that correspond to the different accelerations or speeds can be determined by dividing a position signal output by the motor 110 that is connected to the wheel 104 a ratio of rotational coupling between the motor 110 and the wheel 104. For example, the motors 110 may output position signals to the analysis system 116 so that the analysis system 116 can determine the rotational positions of the motors 110 (e.g., how far the motors 110 have rotated respective shafts, gears, or the like, that are interconnected with the motors 110 and the wheels 104 between the motors 110 and the wheels 104). The gears, axles, and the like, that are between the motor 110 and the wheel 104 may have gear ratios to translate rotary motion by the motor 110 into rotary motion of the wheel 104, and/or to increase or decrease the torque generated by the motor 110. The position signal output by the motor 110 can be divided by the gear ratio of the gears between the motor 110 and the wheel 104 to determine the position of the wheel 104 that is in contact with the route. Alternatively, the positions along the outer perimeter 106 of the wheel 104 that contact the route at different times can be determined by calculating a time integral of rotational speeds of the wheel. For example, for each rotation of the wheel, the rotational speed of a wheel can be multiplied by the time since the current rotation began to determine which portion of the wheel 104 is contacting the route.

The horizontal axis 602 extends from zero to 360 to represent the range of positions around the outer perimeter 106 of the wheel 104. The analysis system 116 may calculate the accelerations that make up the speed signature 600 by calculating changes in the rotational speeds of the wheel 104 when different portions of the outer perimeter 106 of the wheel 104 contact the route 102. In one aspect, the analysis system 116 temporally correlates the rotational speeds measured by the speed sensor 118 associated with the wheel 104 with different locations along the outer perimeter 106 of the wheel 104. The analysis system 116 can perform this correlation by determining when different portions of the outer perimeter 106 of the wheel 104 contact the route 102 based on the size of the wheel 104 (e.g., diameter, circumference, or radius) and the vehicle speed. For example, depending on the size of the circumference of the outer perimeter 106 of the wheel 104 and how fast the vehicle 100 is moving, different locations of the outer perimeter 106 contact the route 102 at different times. The analysis system 116 can determine when the same or approximately same location of the outer perimeter 106 of the wheel 104 contacts the route 102 and associate the rotational speeds measured by the rotational speed sensor 118 at those times. This same association can be performed for other locations along the outer perimeter 106 of the wheel 104.

The analysis system 116 can then convert the measured rotational speeds of the wheel 104 to accelerations by calculating the changes in the rotational speeds with respect to time when neighboring locations of the wheel 104 contact the route 102. For example, the analysis system 116 can calculate the change in rotational speed with respect to time when a first location along the outer perimeter 106 of the wheel 104 contacts the route 102 to a subsequent time when a different, neighboring, second location along the outer perimeter 106 of the wheel 104 contacts the route 102. This change can be represented by plotting a value of the acceleration (e.g., the change in rotational speeds) along the vertical axis 604 of the speed signature 600 at the corresponding locations along the horizontal axis 602 of the speed signature 600. This calculation can be repeated several times for different changes in rotational speeds and/or for different locations along the outer perimeter 106 of the wheel 104 to create the speed signature 600 shown in FIG. 6.

The analysis system 116 can examine the calculated accelerations that make up the speed signature 600 to identify one or more peaks 606, 608 that may be indicative of the damaged portion 200 in the wheel 104 striking the route 102. For example, the analysis system 116 can compare the speed signature 600 to one or more designated acceleration thresholds 610, 612, and/or to a designated range 614 of acceptable accelerations, in order to identify the peaks 606, 608. In the illustrated example, the peaks 606, 608 extend outside of the range 614, with the peak 606 being larger in the positive direction along the vertical axis 604 than the upper threshold 610 and the peak 608 being larger in the negative direction along the vertical axis 604 than the lower threshold 612. Responsive to identifying the peak 606 and/or 608, the analysis system 116 can identify the wheel 104 as having the damaged portion 200 and/or a damaged drivetrain.

Figure 7:
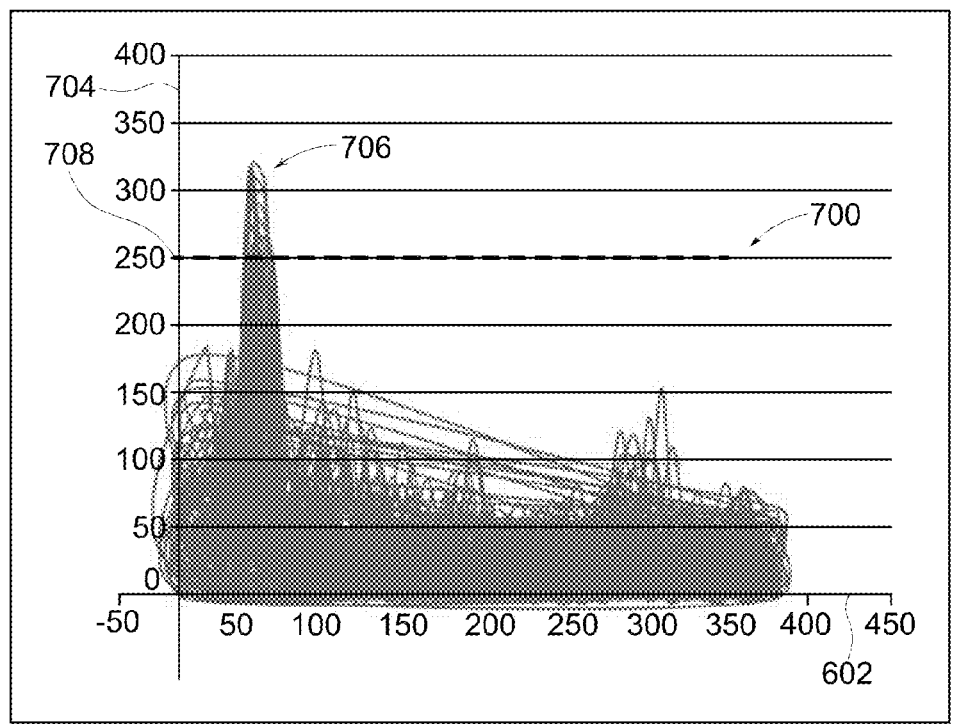
FIG. 7 illustrates another spatial domain speed signature of a wheel of the vehicle shown in FIG. 1 in accordance with one example of the inventive subject matter described herein.

FIG. 7 illustrates another spatial domain speed signature 700 of a wheel 104 of the vehicle 100 in accordance with one example of the inventive subject matter described herein. Similar to the speed signature 600 shown in FIG. 6, the speed signature 700 represents accelerations of different locations along the outer perimeter 106 (shown in FIG. 1) of the wheel 104. The speed signature 700 is shown alongside the horizontal axis 602 described above and a vertical axis 704 representative of acceleration. In contrast to the speed signature 600 of FIG. 6, the accelerations that make up the speed signature 700 in FIG. 7 represent absolute values of the accelerations. As a result, the vertical axis 704 only includes positive values of accelerations of the wheel 104. Optionally, the speed signature 700 could represent squared values or calculations of the accelerations of the speed signature 600.

The analysis system 116 can examine the absolute values of the accelerations that make up the speed signature 700 to identify one or more peaks 706 that may be indicative of the damaged portion 200 in the wheel 104 striking the route 102 and/or movement of damaged portions of the drivetrain. For example, the analysis system 116 can compare the speed signature 700 to a designated acceleration threshold 708 in order to identify the peak 706. In the illustrated example, the peak 706 extends above the threshold 708. Responsive to identifying the peak 706, the analysis system 116 can identify the wheel 104 as having the damaged portion 200 and/or the drivetrain as being damaged.

The analysis system 116 can present one or more of the speed signatures described herein to an operator of the monitoring system 122 (shown in FIG. 1). For example, the analysis system 116 can display one or more of the speed signatures on a display device onboard the vehicle 100, at an off-board facility, both locations, or in another location. Displaying the speed signature 700 that includes the absolute values of the accelerations of the wheel 104 can allow the operator to more easily recognize and identify the peak 706 that is indicative of the damaged portion 200 in the wheel 104 and/or the damaged drivetrain than one or more of the other speed signatures.

Figure 8:
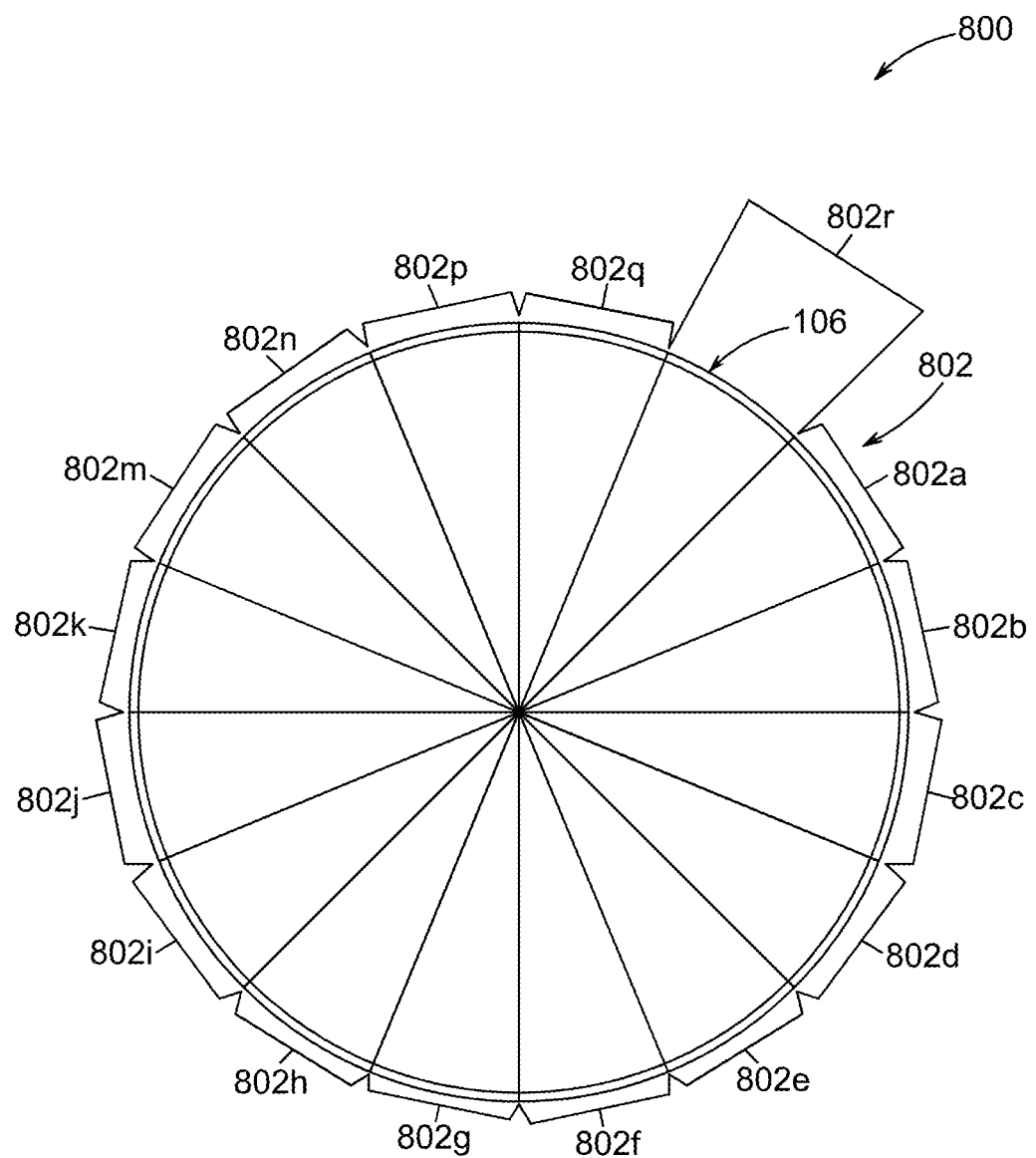
FIG. 8 illustrates a spatial map of the wheel shown in FIG. 1 according to one example of the inventive subject matter described herein.

FIG. 8 illustrates a spatial map 800 of the wheel 104 shown in FIG. 1 according to one example of the inventive subject matter described herein. The spatial map 800 divides the outer perimeter 106 of the wheel 104 into several separate arc segments 802 (e.g., segments 802a-k, 802m-n, 802p-r). Although there are sixteen segments 802 in the illustrated example, alternatively there may be a lesser or greater number of segments 802. The segments 802 may be non-overlapping segments. The segments 802 may be equally sized such that each segment 802 includes the same sized arc of the outer perimeter 106.

The analysis system 116 (shown in FIG. 1) can use the spatial map 800 to apply a low pass filter to accelerations and/or rotational speeds measured by the speed sensor 118 (shown in FIG. 1) associated with the wheel 104. For example, the analysis system 116 can calculate accelerations from the rotational speeds of the wheel 104 and temporally correlate the actual measured rotational speeds of the wheel 104 with different segments 802 of the wheel 104. Optionally, the analysis system 116 can temporally correlate the rotational speeds with different segments 802 of the wheel 104 and then calculate accelerations from these rotational speeds. The temporal correlation can involve associating the accelerations or measured rotational speeds with different locations along the outer perimeter 106 of the wheel 104 based on when the rotational speeds were measured and when the different locations of the wheel 104 were in contact with the route 102 (as described above). With the spatial map 800, the analysis system 116 can group or bin the accelerations and/or measured rotational speeds with different segments 802 of the wheel 104.

For example, based on the vehicle speed, the analysis system 116 can determine when a first arc segment 802 contacts the route 102 (or should be contacting the route 102 if that arc segment 802 speeds up due to a damaged portion 200 in the wheel 104), when a second, neighboring arc segment 802 contacts the route 102, when a third, neighboring arc segment 802 contacts the route 102, and so on. The analysis system 116 may not identify which exact arc segment 802 is actually contacting the route 102. Instead, the analysis system 116 can just determine the different time periods that different arc segments 802 are contacting or should be contacting the route 102 based on the vehicle speed. For example, the analysis system 116 may determine that a first arc segment 802a contacts the route 102 during a first time period, a second arc segment 802b contacts the route 102 during a subsequent (e.g., immediately following the first time period) second time period, a third arc segment 802c contacts the route 102 during a subsequent third time period, and so on. If there are sixteen arc segments 802, then the analysis system 116 also may determine that the first arc segment 802a also contacts the route 102 during a seventeenth time period, the second arc segment 802b also contacts the route 102 during a subsequent eighteenth time period, the third arc segment 802c also contacts the route 102 during a subsequent nineteenth time period, and so on. Alternatively, a different number of arc segments 802 and time periods may be used.

The analysis system 116 can then group or bin the calculated accelerations or measured rotational speeds of the wheel 104 into the time periods associated with different arc segments 802 of the wheel 104. For example, the accelerations calculated from the rotational speeds of the wheel 104 that were measured during the first, seventeenth, thirty-third, forty-ninth, sixty-fifth, and so on, time periods may be grouped together in a first group of rotational speeds associated with the first arc segment 802a; the accelerations calculated from the rotational speeds of the wheel 104 that were measured during the second, eighteenth, thirty-fourth, fiftieth, sixty-sixth, and so on, time periods may be grouped together in a second group of rotational speeds associated with the second arc segment 802b; the accelerations calculated from the rotational speeds of the wheel 104 that were measured during the third, nineteenth, thirty-fifth, fifty-first, sixty-seventh, and so on, time periods may be grouped together in a third group of rotational speeds associated with the third arc segment 802c; and so on.

The analysis system 116 can apply a low pass filter to the accelerations or measured rotational speeds in the various groups to reduce or eliminate noise from the accelerations or measured speeds. For example, the analysis system 116 can calculate an average, median, or other statistical calculation of the accelerations or rotational speeds as filtered accelerations or filtered rotational speeds for the groups of rotational speeds. As a result, a first filtered acceleration or rotational speed may be calculated for the first group of rotational speeds, a second filtered acceleration or rotational speed may be calculated for the second group of rotational speeds, a third filtered acceleration or rotational speed may be calculated for the third group of rotational speeds, and so on. Additional filtered accelerations or rotational speeds may be calculated for one or more of the same groups of rotational speeds.

Figure 9:
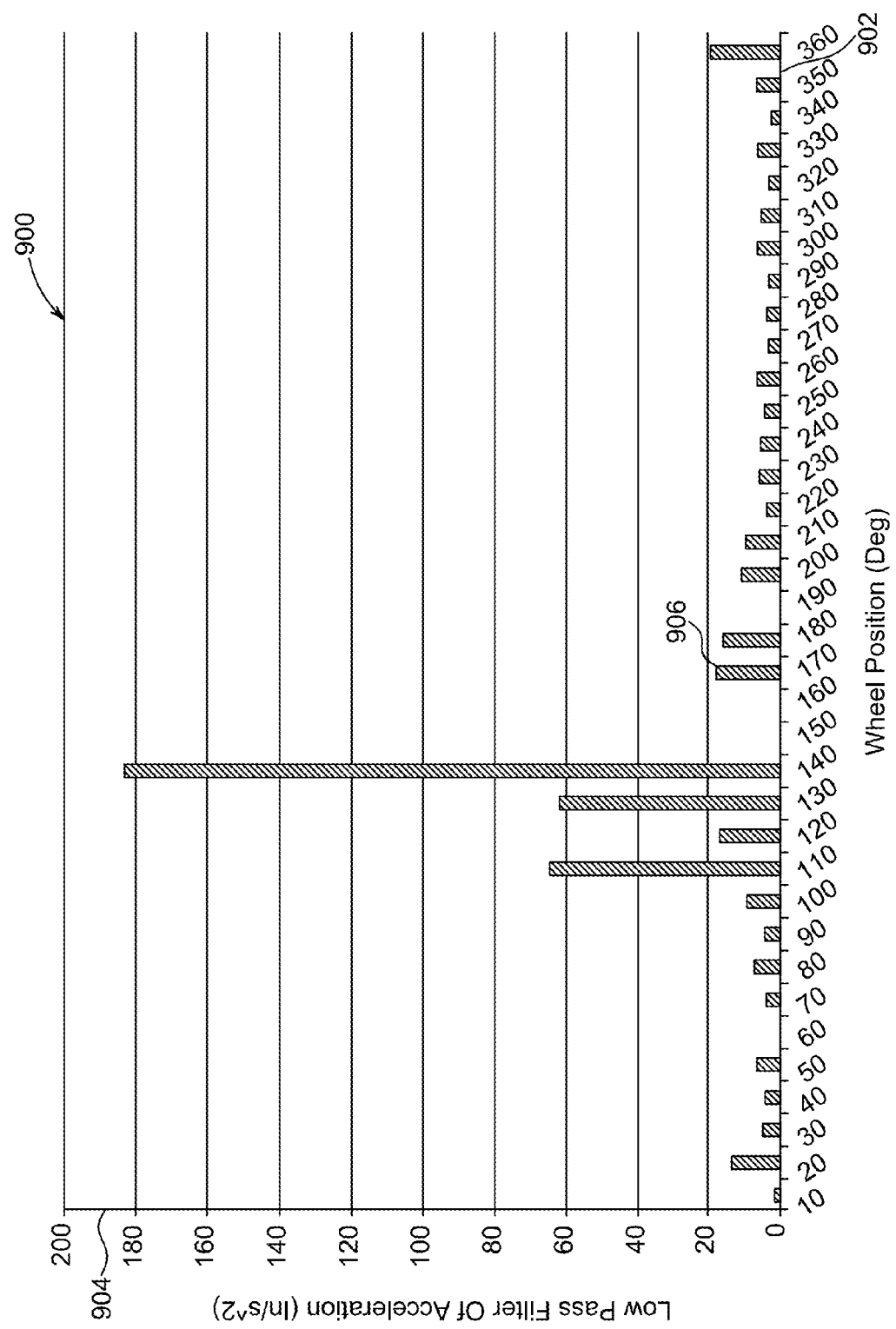
FIG. 9 illustrates another spatial domain speed signature of the wheel shown in FIG. 1 in accordance with one example of the inventive subject matter described herein.

FIG. 9 illustrates another spatial domain speed signature 900 of the wheel 104 in accordance with one example of the inventive subject matter described herein. Similar to the speed signatures 600, 700 shown in FIGS. 6 and 7, the speed signature 900 represents accelerations of different locations along the outer perimeter 106 (shown in FIG. 1) of the wheel 104. The speed signature 900 is shown alongside a horizontal axis 902 that is representative of different arc segments of the wheel 104 and a vertical axis 904 that is representative of filtered accelerations.

The speed signature 900 illustrates bars 906 representative of filtered accelerations that were calculated by the analysis system 116 for different arc segments of the wheel 104. Each bar 906 represents the filtered acceleration calculated for a different arc segment of the wheel 104. In the illustrated example, each arc segment represents a different ten degree arc of the wheel 104. Alternatively, a different number of arc segments may be used. As show in the speed signature 900, the arc segment associated the $140^{th}$ degree position along the outer perimeter 106 of the wheel 104 has a much larger filtered acceleration than the other arc segments. The analysis system 116 can present the speed signature 900 to an operator of the monitoring system 122 (shown in FIG. 1) to allow the operator to identify this arc segment as having the larger filtered acceleration and, as a result, is indicative of the damaged portion 200 (shown in FIG. 2) in the wheel 104. Additionally or alternatively, the analysis system 116 may detect the bar 906 associated with the $140^{th}$ degree position along the outer perimeter 106 of the wheel 104 as having a much larger filtered acceleration than the other arc segments, and, as a result, is indicative of the damaged portion 200 (shown in FIG. 2) in the wheel 104 and/or a damaged drivetrain.

In one aspect, the analysis system 116 can perform a wavelet analysis of a speed signature in order to determine if one or more wheels 104 of the vehicle 100 have damaged portions 200. The analysis system 116 can obtain (e.g., by measuring or getting from a database or other memory structure) a time domain speed signature of a wheel 104 that is known to be round and not have any significantly damaged portions. The rotational speeds of the round wheel that are included in the speed signature can be measured over a relatively long period of time, such as several hours, days, or weeks.

The analysis system 116 can examine the time domain speed signature of the round wheel 104 to identify one or more waveforms. Additionally or alternatively, the analysis system 116 can examine a frequency domain speed spectrum of the measured rotational speeds for the round wheel 104 to identify one or more waveforms.

Figure 10:
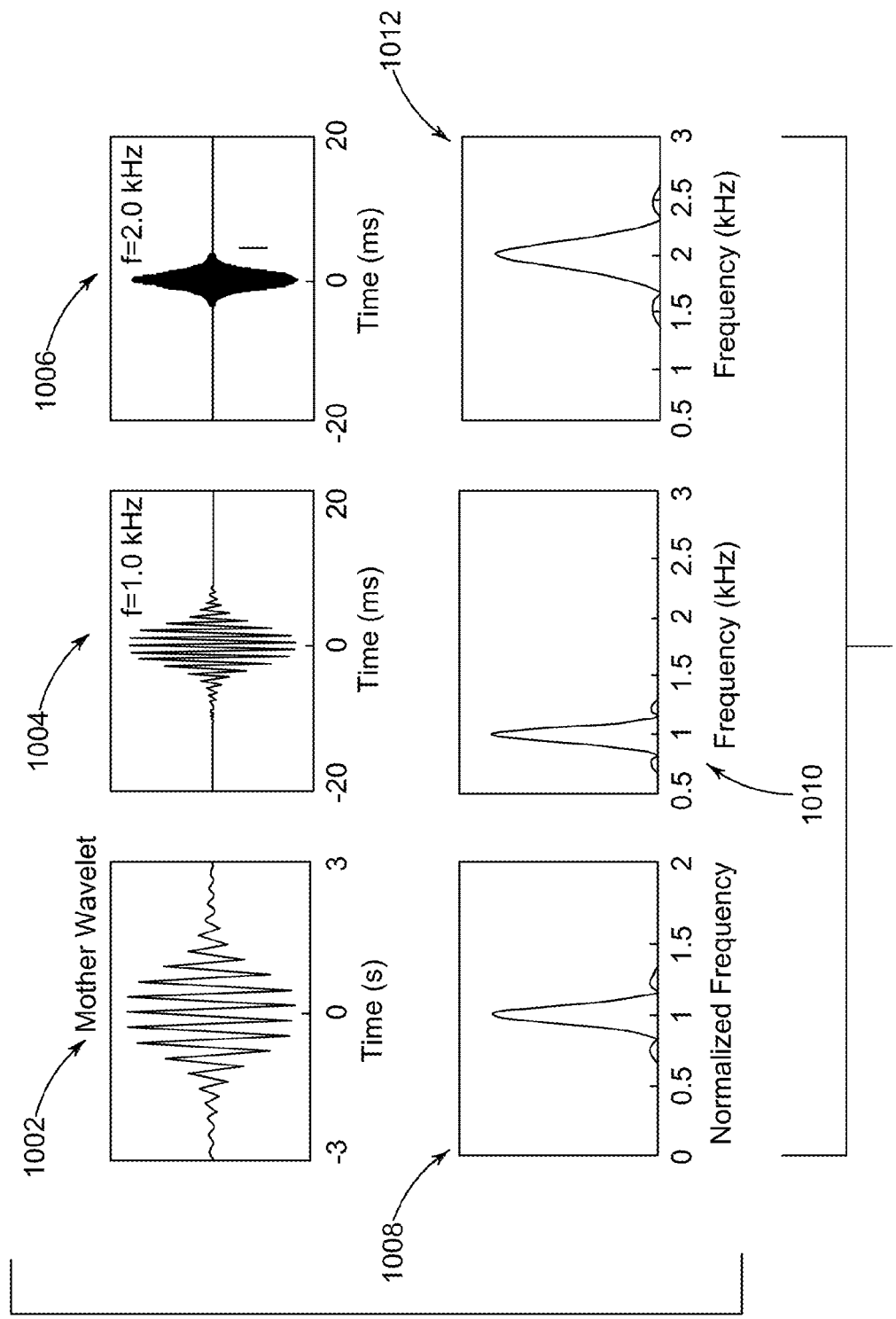
FIG. 10 illustrates several examples of waveforms that may be identified by an analysis system shown in FIG. 1 from time domain and/or frequency domain speed signatures of a round wheel.

FIG. 10 illustrates several examples of waveforms 1000, 1002, 1004, 1006, 1008, 1010 that may be identified by the analysis system 116 from the time domain and/or frequency domain speed signatures of a round wheel 104. The analysis system 116 can identify one or more of these waveforms when the waveforms appear at designated speeds or frequencies in the speed signatures of the round wheel 104, and/or when the waveforms are repeated one or more times, or at least a designated number of times, in the speed signatures of the round wheel 104. These waveforms may be saved and can represent movement of a round wheel 104 that does not include the damaged portion 200 and/or a drivetrain that is not damaged. These waveforms can be referred to as mother wavelets.

Figure 11:
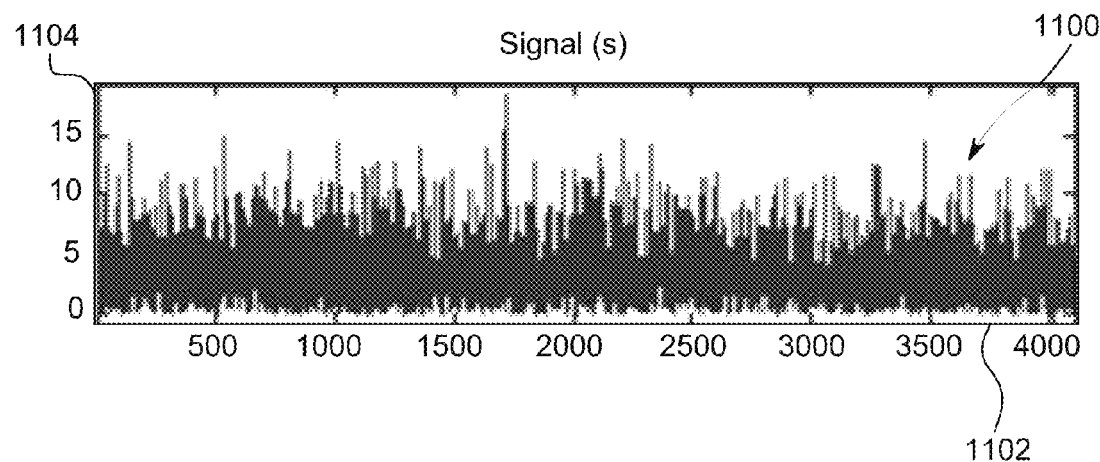
FIG. 11 illustrates one example of an additional time domain speed signature from a wheel of the vehicle shown in FIG. 1.

The analysis system 116 can obtain additional speed signatures from one or more wheels 104 of the vehicle 100, as described above, and compare these speed signatures to one or more of the mother wavelets. FIG. 11 illustrates one example of an additional time domain speed signature 1100 from a wheel 104 of the vehicle 100. The speed signature 1100 is shown alongside a horizontal axis 1102 representative of time and a vertical axis 1104 representative of rotational speeds. If the wheel 104 has a damaged portion 200 and/or the drivetrain is damaged, then parts of the speed signature 1100 can represent accelerations (e.g., changes in rotational speed) of the wheel 104 caused by the damaged portion 200 striking the route 102 and/or movement of the damaged drivetrain, while other parts of the speed signature 1100 can represent the movement of the round portions of the wheel 104 over the route 102.

In order to separate the portions of the speed signature 1100 representative of the damaged portion 200 of the wheel 104 traveling over the route 102 and/or a damaged drivetrain from the portions of the speed signature 1100 representative of the non-damaged portions of the wheel 104 traveling over the route 102 and/or a drivetrain that is not damaged, the analysis system 116 can compare one or more of the mother wavelets to the speed signature 1100. In one aspect, the analysis system 116 performs a mathematical convolution of the selected mother wavelets and the speed signature 1100 of the wheel 104. This convolution can determine an area or amount of overlap between the speed signature 1100 and the mother wavelet. Optionally, the analysis system 116 can perform another calculation or examination in order to determine which portions of the speed signature 1100 match the mother wavelet or more closely match the mother wavelet than one or more other waveforms or wavelets.

Figure 12:
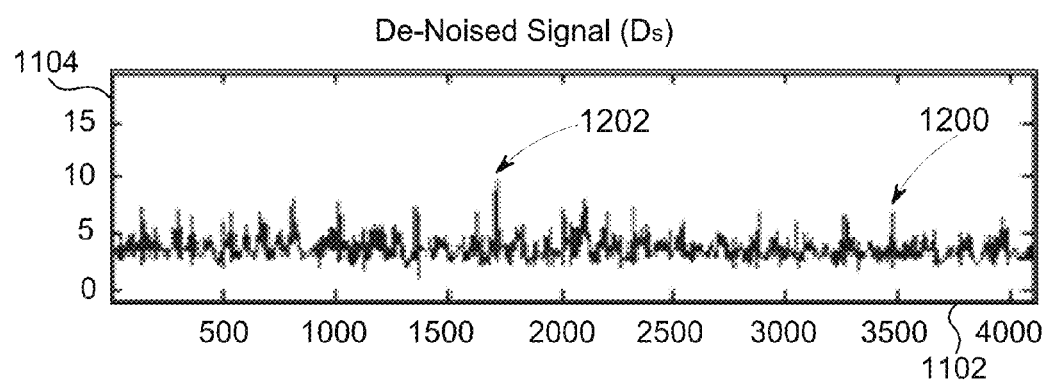
FIG. 12 illustrates a de-noised time domain speed signature of the wheel shown in FIG. 1 according to one example.

Based on this comparison, the analysis system 116 identifies the portions of the speed signature 1100 that do not match the mother wavelet. FIG. 12 illustrates a de-noised time domain speed signature 1200 of the wheel 104. The speed signature 1200 represents the speed signature 1100 of the wheel 104, but with the portions of the speed signature 1100 that represent movement of the round portions of the wheel 104 traveling over the route 102 removed from the speed signature 1100.

The analysis system 116 can examine the de-noised speed signature 1200 to determine using one or more techniques described herein to determine if the speed signature 1200 indicates that the wheel 104 has one or more damaged portions 200 and/or that the drivetrain is damaged. For example, the analysis system 116 can determine if the speed signature 1200 includes one or more peaks 1202 (which can indicate the presence of the damaged portion 200 in the wheel 106 and/or the damaged drivetrain). As another example, the analysis system 116 can generate a frequency domain speed signature from the speed signature 1200 and examine the frequency domain speed signature for one or more peaks at one or more frequencies (e.g., the fundamental and/or harmonic frequencies), which can indicate the presence of the damaged portion 200 in the wheel 106 and/or a damaged drivetrain. In another aspect, the analysis system 116 can generate a spatial domain speed signature from the speed signature 1200 and examine the spatial domain speed signature for one or more peaks (which can indicate the presence of the damaged portion 200 in the wheel 106 and/or a damaged drivetrain). Alternatively, the analysis system 116 can examine the speed signature 1200 in another manner.

Figure 13:
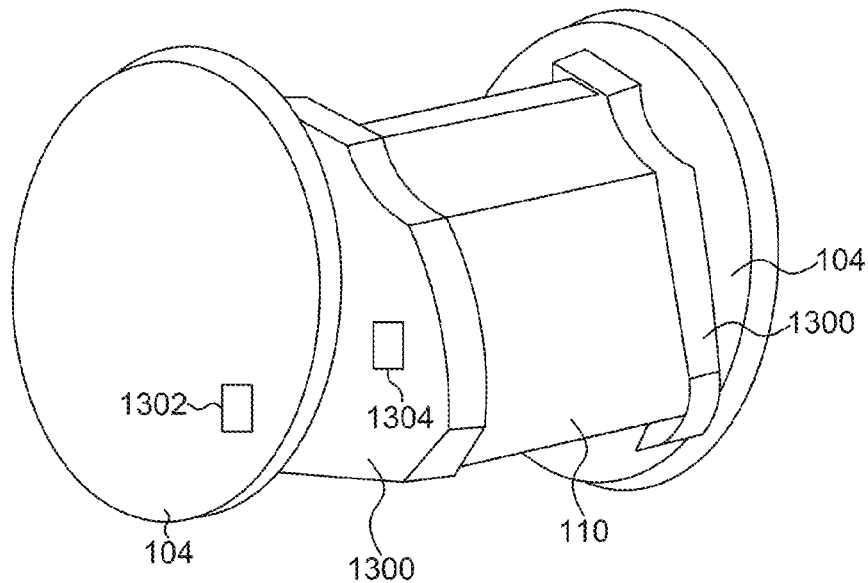
FIG. 13 is a schematic illustration of two wheels of the vehicle shown in FIG. 1 connected with motor gear cases and a traction motor in accordance with one example of the inventive subject matter.

FIG. 13 is a schematic illustration of two wheels 104 of the vehicle 100 connected with motor gear cases 1300 and a traction motor 110 in accordance with one example of the inventive subject matter. The motor gear cases 1300 and/or traction motor 110 can be included in the drivetrain of the vehicle 100. The gear gases 1300 include gears that translate the rotary movement generated by the motor 110 into rotation of the wheels 104. In one aspect, one or more of the gear cases 1300 and/or the wheels 104 may have a radio frequency identification (RFID) tag 1302, 1304 that is used to detect the presence of a damaged portion 200 along one or more of the wheels 104 and/or a damaged drivetrain.

The RFID tag 1302, 1304 can include an antenna in an RFID circuit that is activated when the force experienced by the RFID tag 1302, 1304 exceeds a non-zero threshold force. For example, when a damaged portion 200 in one of the wheels 104 strikes the route 102 (shown in FIG. 1), the wheel 104 and/or gear case 1300 may experience a vibratory or other force. This force may close or open the electronic circuit in the RFID tag 1302, 1304 that includes an antenna. As a result, the RFID tag 1302, 1304 may then be enabled to wirelessly communicate with an RFID reader or may be prevented from further communication with the RFID reader. In either situation, the RFID tag 1302, 1304 can be examined by the analysis system 116 shown in FIG. 1 (e.g., with the analysis system 116 including or representing an RFID reader) and/or a human operator of the monitoring system 122 (shown in FIG. 1) to determine if the wheel 104 includes the damaged portion 200.

Figure 14:
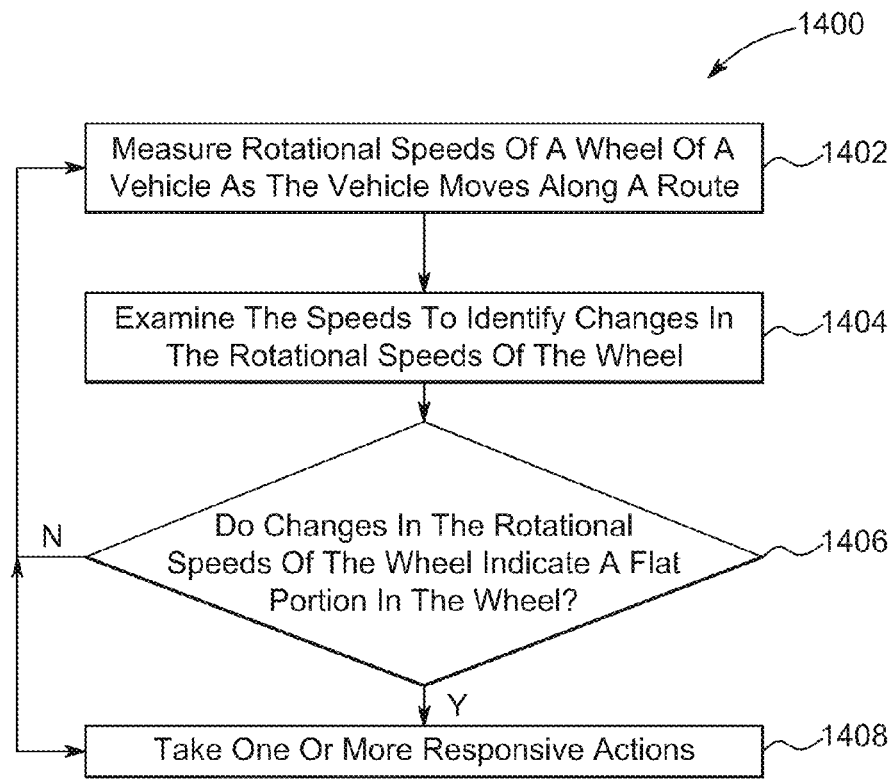
FIG. 14 illustrates a flowchart of a method for monitoring a wheel of a vehicle for damage to the wheel according to one example of the inventive subject matter described herein.

FIG. 14 illustrates a flowchart of a method 1400 for monitoring a vehicle according to one embodiment. The method 1400 may be performed by the monitoring system 122 (shown in FIG. 1) described above. At 1402, rotational speeds of one or more wheels of a vehicle are measured as the vehicle moves along a route. The rotational speeds may be measured by speed sensors, such as tachometers.

At 1404, the rotational speeds of the wheels are examined for changes. As described above, in one aspect, a time domain speed signature of the rotational speeds of a wheel can be examined for increases, such as periodically occurring peaks. In another aspect, time domain speed signatures of the rotational speeds for two or more wheels of the vehicle can be compared to determine if any of the speed signatures include an increase in the rotational speed of one wheel when the speed signatures for one or more (or all) of the other wheels do not include such an increase. In another aspect, a frequency domain speed signature or spectrum of the rotational speeds of a wheel can be generated and examined for peaks at one or more frequencies, such as at the fundamental and/or harmonic frequencies of the wheel. In another aspect, frequency domain speed signatures or spectra of the rotational speeds for two or more wheels of the vehicle can be compared to determine if any of the spectra include an increase in the rotational speed of one wheel when the spectra for one or more (or all) of the other wheels do not include such an increase. In another aspect, accelerations can be calculated from the rotational speeds for different locations along an outer perimeter of the wheel (as described above in a spatial domain analysis of the speeds), and these accelerations can be inspected to determine if any location or locations along the outer perimeter of the wheel are associated with larger accelerations than other locations along the outer perimeter of the wheel.

At 1406, a determination is made as to whether the changes in the rotational speeds of the wheel indicate that the wheel has a damaged portion and/or that the drivetrain is damaged. As one example, if the time domain speed signature of the rotational speeds of the wheel includes peaks or increases, such as periodically occurring peaks, then the wheel may be identified as having a damaged portion and/or that the drivetrain is damaged. In another example, if any of the speed signatures for the wheels of the vehicle include an increase in the rotational speed of one wheel when the speed signatures for one or more (or all) of the other wheels do not include such an increase, then the wheel associated with the increase may be identified as having the damaged portion and/or the drivetrain may be identified as being damaged. In another example, if the frequency domain speed signature or spectrum of the rotational speeds of the wheel includes one or more peaks at one or more frequencies, such as at the fundamental and/or harmonic frequencies of the wheel, then the wheel may be identified as having the damaged portion and/or the drivetrain may be identified as being damaged. In another example, if the frequency domain speed signature or spectrum for an examined wheel includes an increase when the spectra for one or more (or all) of the other wheels do not include such an increase, then the examined wheel may be identified as having the damaged portion and/or the drivetrain may be identified as being damaged. In another example, if the accelerations in the rotational speeds of a wheel indicate that a location or locations along the outer perimeter of the wheel are associated with larger accelerations than other locations along the outer perimeter of the wheel, then the wheel may be identified as having the damaged portion and/or the drivetrain may be identified as being damaged.

If the wheel is identified as having a damaged portion and/or the drivetrain is identified as being damaged, flow of the method 1400 can proceed to 1408. Otherwise, flow of the method 1400 can return to 1402. At 1408, one or more remedial actions can be taken. For example, the analysis system 116 (shown in FIG. 1) can generate one or more signals that are communicated to an operator of the monitoring system 122 (shown in FIG. 1) to notify the operator of the identified damaged portion of the wheel and/or the drivetrain. These signals may be presented on an output device of the monitoring system 122, such as a display device, speaker, or other device. Optionally, the analysis system 116 can generate the signals to direct the controller 112 (shown in FIG. 1) to automatically slow or stop movement of the vehicle 100 without operator intervention. The analysis system 116 can generate the signals to be communicated by the communication system 114 (shown in FIG. 1) to one or more off-board locations, such as a repair facility, to notify the off-board location of the need to further inspect and/or replace the wheel and/or drivetrain.

Figure 15:
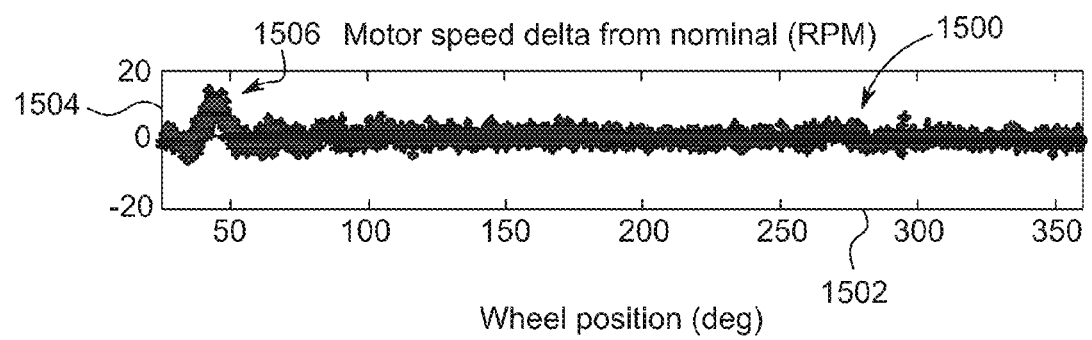
FIG. 15 illustrates another spatial domain speed signature of a wheel of the vehicle in accordance with another embodiment.

FIG. 15 illustrates another spatial domain speed signature 1500 of a wheel 104 (shown in FIG. 1) of the vehicle 100 (shown in FIG. 1) in accordance with another embodiment. The speed signature 1500 represents differences between rotational speeds of a wheel 104 at different locations along the outer perimeter 106 (shown in FIG. 1) of the wheel 104. The speed signature 1500 is shown alongside a horizontal axis 1502 representative of wheel location and a vertical axis 1504 representative of rotational speeds.

The rotational speeds represented by the speed signature 1500 are differences between a nominal or baseline rotational speed of the wheel 104 and measured rotational speeds of the wheel 104. The analysis system may determine the nominal rotational speed of the wheel 104 by calculating a root mean square, median, average, or other measurement of previous rotational speeds of the wheel 104. For example, the nominal speed may be an average or median rotational speed of the wheel from a previous rotation of the wheel. As another example, the nominal rotational speed may be determined by applying a low pass filter, such as a first order low pass filter, a second order low pass filter (e.g., a filter that has little to no steady state error to a ramp signal), or the like, to the rotational speeds of the wheel. The low pass filter can remove the portions of the rotational speeds of the wheel that rapidly change, such as would occur when a damaged portion of the wheel strikes the route and/or when the drivetrain is damaged. For example, the low pass filter can remove those wheel rotational speeds that change (e.g., rapidly increase and then decrease) within a designated time period. This designated time period can change based on the vehicle speed. For example, for faster vehicle speeds, the time period of the low pass filter can be a shorter time period than for slower vehicle speeds.

Responsive to determining that the vehicle 100 is operating in a steady state, then monitoring system 122 may measure additional rotational speeds of the wheel 104. The speed signature 1500 can be determined by subtracting the nominal rotational speed from the additional rotational speeds of the wheel 104. As shown in FIG. 15, because the additional rotational speeds of the wheel 104 are close in value to the nominal rotational speed for a large majority of the outer perimeter 106 of the wheel 104, the values of the speed signature 1500 remain at or near a value of zero. As or near the forty-five degree location along the outer perimeter 106 of the wheel 104, however, a wheel velocity peak 1506 appears in the speed signature 1500. The monitoring system 122 can identify this peak 1506 responsive to the portion of the speed signature 1500 associated with the peak 1506 exceeding above a designated threshold value, such as five RPMs, ten RPMs, fifteen RPMs, or another value. The detection of the peak 1506 can indicate a damaged spot along the outer perimeter 106 of the wheel 104 and/or a damaged drivetrain, as described herein. Alternatively, another measure of the rotational speeds may be performed to identify a damaged portion along the outer perimeter of the wheel and/or a damaged drivetrain. For example, a root mean square (RMS) may be calculated using several or all of the rotational speeds, and portions of the speed signature that exceed the RMS may be identified as being representative of a damaged portion and/or a damaged drivetrain. As another example, a median, average, or other calculation may be performed using several or all of the rotational speeds, and portions of the speed signature that exceed the median, average, or other calculation may be identified as being representative of a damaged portion of the wheel and/or drivetrain.

Figure 16:
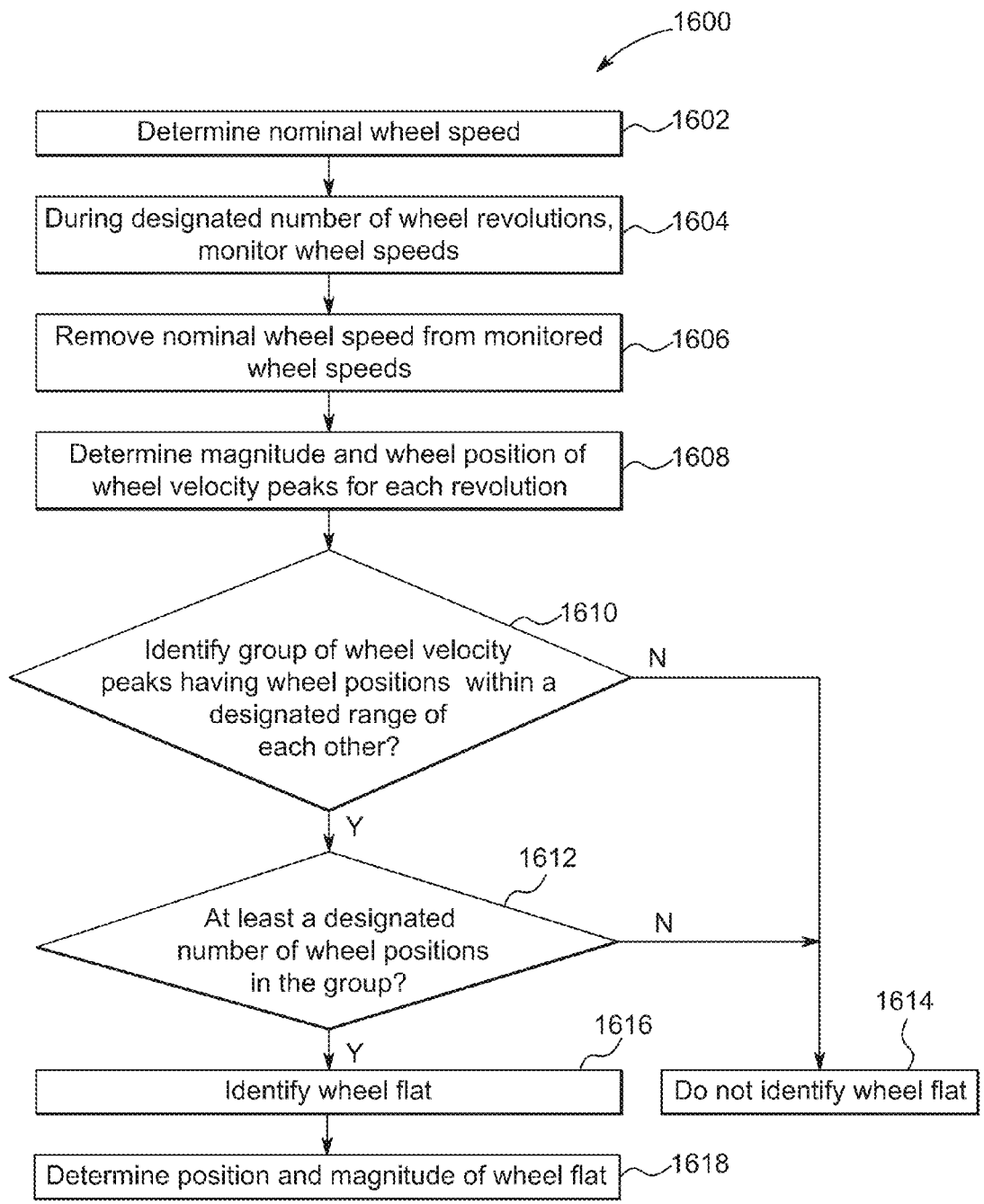
FIG. 16 illustrates a flowchart of another embodiment of a method for monitoring a vehicle.

FIG. 16 illustrates a flowchart of another embodiment of a method 1600 for monitoring a vehicle. In one embodiment, the method 1600 may be performed by all or part of the monitoring system and/or analysis system described herein. The order of operations shown in the flowcharts herein is not limiting on all embodiments of the methods disclosed herein. Two or more of the operations of the methods may be performed in another, different order, may be performed simultaneously, and/or may be performed concurrently. The method 1600 may be used to identify damaged wheels and/or drivetrains by identifying wheel velocity peaks occurring in the same or nearby wheel positions over multiple revolutions of the wheel, as one example.

At 1602, a nominal or baseline rotational speed of a wheel of a vehicle is determined. This nominal speed can be measured by rotational speed sensors of the vehicle during a designated time period. The designated time period can occur when the vehicle is moving and/or the wheel is rotating at a constant or substantially constant speed, and/or when the vehicle is operating in a steady state mode of operation. As one example, the designated time period can occur when the vehicle speed does not change by more than a designated amount, such as 1%, 3%, 5%, 10%, or another amount. Optionally, the designated time period additionally or alternatively can occur while the vehicle is motoring or coasting, but not accelerating or decelerating.

At 1604, wheel speeds (e.g., rotational speeds of the wheel) are monitored during a designated number of rotations of the wheel. As one example, the rotational speeds of the wheel are measured by one or more rotational speed sensors for fifty complete revolutions of the wheel. Alternatively, the rotational speeds of the wheel are measured by one or more rotational speed sensors for another number of revolutions of the wheel, such as ten, twenty, one hundred, one thousand, or another number of revolutions. The rotational speeds can be measured when the vehicle is moving at a constant or substantially constant speed, and/or when the vehicle is operating in a steady state mode of operation. As one example, the designated time period can occur when the vehicle speed does not change by more than a designated amount, such as 1%, 3%, 5%, 10%, or another amount. Optionally, the rotational speeds can be measured while the vehicle is motoring or coasting, but not accelerating or decelerating.

At 1606, the nominal wheel speed can be removed from the wheel speeds monitored at 1604. For example, the wheel speeds may be modified by removing the nominal wheel speed of the wheel from the rotational speeds measured at 1604. Optionally, the nominal wheel speed is not removed from the wheel speeds monitored at 1604.

At 1608, the magnitude and wheel position of wheel velocity peaks are determined for each revolution of the wheel. As described above, a peak 1506 can be identified from the wheel speeds. During the different revolutions of the wheel, one or more peaks 1506 may be identified during one or more revolutions of the wheel. In one embodiment, the analysis system can sort the wheel speeds by the associated position of the wheel when the wheel speeds were measured. The table below illustrates one example of wheel velocity peaks and associated wheel positions during different revolutions of the wheel. In the table below, the numbers beneath "Rev" indicate the revolution of the wheel in which the corresponding wheel velocity peak and position were measured, the numbers beneath "Pos (deg)" indicate the position along the outer perimeter of the wheel at which the corresponding wheel speed was measured (in terms of degrees), and the numbers beneath "RPM Del" represent the difference between the measured wheel velocity peak and the nominal wheel speed at the corresponding wheel position and revolution.

| Rev | Pos (deg) | RPM Del |
|---|---|---|
| 19 | 14.2826 | 4.9033 |
| 12 | 16.3555 | 4.4652 |
| 9 | 18.1066 | 5.897 |
| 11 | 41.3708 | 4.6099 |
| 14 | 41.652 | 6.3324 |
| 15 | 42.3957 | 5.4029 |
| 3 | 43.4218 | 4.304 |
| 16 | 43.5703 | 10.4597 |
| 8 | 44.0296 | 8.0802 |
| 17 | 44.753 | 6.3401 |
| 7 | 45.3806 | 8.109 |
| 2 | 45.5736 | 4.6906 |
| 18 | 46.2005 | 8.8388 |
| 6 | 46.8977 | 8.1239 |
| 1 | 47.5938 | 6.3535 |
| 5 | 48.2225 | 10.1195 |
| 4 | 49.6672 | 3.5964 |
| 10 | 267.5423 | 4.2528 |
| 13 | 275.9034 | 4.7661 |
| 0 | 357.6246 | −2.4622 |

The revolutions, wheel velocity peaks, and wheel positions in the table above are sorted in an ascending order by wheel position. Alternatively, the revolutions, wheel velocity peaks, and/or wheel positions may be sorted in another manner.

At 1610, a determination is made as to whether one or more groups of wheel velocity peaks can be identified, with the wheel velocity peaks in the groups having wheel positions within a designated range of each other. For example, the sorted list of wheel velocity peaks and positions can be examined in order to determine if a group of these wheel velocity peaks occur within a designated range of wheel positions of each other. In one aspect, a group is identified responsive to plural wheel velocity peaks having wheel positions that are within fifteen degrees of each other. Alternatively, a group can be identified responsive to plural wheel velocity peaks having wheel positions within another spatial range of each other, such as five degrees, ten degrees, twenty degrees, thirty degrees, or the like.

In the table shown above, three such groups may be identified. A first group may include the first through third wheel velocity peaks:

| Rev | Pos (deg) | RPM Del |
|---|---|---|
| 19 | 14.2826 | 4.9033 |
| 12 | 16.3555 | 4.4652 |
| 9 | 18.1066 | 5.897 |

A different, second group may include the fourth through seventeenth wheel velocity peaks:

| Rev | Pos (deg) | RPM Del |
|---|---|---|
| 11 | 41.3708 | 4.6099 |
| 14 | 41.652 | 6.3324 |
| 15 | 42.3957 | 5.4029 |
| 3 | 43.4218 | 4.304 |
| 16 | 43.5703 | 10.4597 |
| 8 | 44.0296 | 8.0802 |
| 17 | 44.753 | 6.3401 |
| 7 | 45.3806 | 8.109 |
| 2 | 45.5736 | 4.6906 |
| 18 | 46.2005 | 8.8388 |
| 6 | 46.8977 | 8.1239 |
| 1 | 47.5938 | 6.3535 |
| 5 | 48.2225 | 10.1195 |
| 4 | 49.6672 | 3.5964 |

A different, third group may include the eighteenth and nineteenth wheel velocity peaks:

| Rev | Pos (deg) | RPM Del |
|---|---|---|
| 10 | 267.5423 | 4.2528 |
| 13 | 275.9034 | 4.7661 |

Alternatively, one or more other groups may be identified. Two or more of the groups may include one or more of the same wheel velocity peaks at the same wheel positions.

If one or more groups of wheel velocity peaks are identified, then flow of the method 1600 can continue to 1612. Otherwise, if no groups of wheel velocity peaks are identified, then flow of the method 1600 can continue to 1614. At 1614, no wheel damage is identified. For example, the analysis system can determine that the wheel speeds and/or wheel velocity peaks do not indicate that the outer perimeter of the wheel includes one or more damaged portions and/or do not indicate that the drivetrain is damaged. As a result, no warning signal is generated to warn an operator of a damaged wheel and/or drivetrain, and/or a signal is generated to notify the operator that no damaged wheel and/or drivetrain is found.

At 1612, a determination is made as to whether one or more of the groups identified at 1610 include at least a designated number of wheel positions associated with the wheel velocity peaks. For example, the number of wheel velocity peaks in each group can be counted in order to determine if there is a sufficient number of wheel velocity peaks to conclude that a damaged wheel and/or drivetrain exists. In one embodiment, if at least one quarter of the total number of wheel positions associated with wheel velocity peaks is included in a group, then the wheel velocity peaks included in that group are determined to represent a damaged wheel and/or drivetrain. In the example described above, if at least five wheel velocity peaks are included in a group, then that group is identified as representing a damaged wheel and/or a damaged drivetrain. Alternatively, another number of wheel positions may be used, such as one third, one fifth, one sixth, or the like. The second group identified above may be found to have a sufficiently large number of wheel positions associated with wheel velocity peaks to represent a damaged portion of a wheel and/or drivetrain. Conversely, the first and second groups may not have a large enough number of wheel positions associated with wheel velocity peaks to represent a damaged portion of a wheel and/or drivetrain.

If a group has at least a designated number of wheel positions associated with wheel velocity peaks, then flow of the method 1600 can continue to 1616. On the other hand, if a group does not have at least the designated number of wheel positions associated with wheel velocity peaks, then flow of the method 1600 can continue to 1614, where no damaged wheel and/or drivetrain is identified with respect to that group.

In another embodiment, the numbers of wheel positions associated with wheel velocity peaks in the groups are compared with each other, and the group associated with the largest number of wheel velocity peaks having nearby wheel positions is identified as being representative of damage to the wheel (e.g., a damaged spot or surface damage), or of damage to a drivetrain of the vehicle.

At 1616, the wheel is identified as having damage (e.g., a damaged portion or surface defects), and/or the drivetrain of the vehicle is identified as being damaged. At 1618, a position and/or magnitude of the damage may be identified. Optionally, the method 1600 may not include 1618. In one embodiment, the position of the damaged portion can be calculated as an average or median of the wheel positions in the group identified in 1616 as being representative of the damaged portion. The magnitude of the damage can be calculated as an average or median of a subset of the wheel velocity peaks in the group identified in 1616 as being representative of the damaged portion. For example, the median of the largest ten percent of the wheel velocity peaks in the group may be calculated as the magnitude of the damaged wheel and/or drivetrain. Alternatively, the magnitude of the damaged portion may be calculated using a larger or smaller set of the wheel velocity peaks in the group.

Optionally, a type of damage may be identified based on the magnitude of wheel velocity peaks in the identified group. For example, for magnitudes that exceed a first threshold, a damaged portion along the wheel perimeter may be identified, for magnitudes that exceed a second threshold but not the first threshold, a smaller damaged portion and/or other surface damage to the wheel may be identified, for magnitudes that exceed a third threshold but not the second threshold, damage to an axle journal may be identified, and for magnitudes that exceed a fourth threshold but not the third threshold, damage to bearings in the motor may be identified.

One or more remedial actions may be taken in response to identifying the damaged portion. For example, the analysis system 116 can generate one or more signals that are communicated to an operator of the monitoring system and/or analysis system to notify the operator of the identified damaged portion of the wheel. These signals may be presented on an output device of the monitoring system and/or analysis system, such as a display device, speaker, or other device. Optionally, the analysis system 116 can generate the signals to direct the controller 112 to automatically slow or stop movement of the vehicle 100 without operator intervention. The analysis system 116 can generate the signals to be communicated by the communication system 114 to one or more off-board locations, such as a repair facility, to notify the off-board location of the need to further inspect and/or replace the wheel.

The type of remedial action that is taken may vary based on the magnitude and/or position of the deviation in the speed signature. For example, for larger magnitudes and/or multiple peaks having positions within a designated range of each other (e.g., thirty degrees, forty-five degrees, or the like), the analysis system 116 can implement a more immediate remedial action, such as automatically slowing or stopping the movement of the vehicle without operator intervention. For smaller magnitudes and/or an absence of multiple peaks, the analysis system 116 can implement less immediate remedial actions, such as warning the operator of the damaged wheel, notifying the off-board location of a need to further inspect and/or replace the wheel and/or parts of the drivetrain, or the like.

In one embodiment, a method (e.g., for monitoring a vehicle includes determining a baseline wheel rotational speed and wheel rotational speeds of a wheel of a vehicle for different positions along an outer perimeter of the wheel that contact a surface of a route, identifying one or more deviations between the wheel rotational speeds and the baseline wheel rotational speed, correlating the one or more deviations between the wheel rotational speeds and the baseline wheel rotational speed with one or more identified positions of the positions along the outer perimeter of the wheel, and identifying one or more of damage to the wheel or damage to a drivetrain of the vehicle based at least in part on the one or more deviations being correlated with the one or more identified positions.

In one aspect, one or more of identifying the one or more deviations, correlating the one or more deviations with the one or more identified positions, or identifying the one or more of damage to the wheel or damage to the drivetrain can occur during movement of the vehicle.

In one aspect, identifying the one or more deviations can include determining one or more of a peak of the wheel rotational speeds, a median of the wheel rotational speeds, an average of the wheel rotational speeds, or a root mean square of the wheel rotational speeds, wherein the one or more deviations exceed the one or more of the peak, the median, the average, or the root mean square to the wheel rotational speeds by at least a designated threshold.

In one aspect, determining the wheel rotational speeds can occur for more than one revolution of the wheel over the route.

In one aspect, the method also can include determining the positions along the outer perimeter of the wheel that correspond to the wheel rotational speeds by dividing a position signal output by a motor operably coupled with the wheel by a gear ratio of one or more components that interconnect the motor with the wheel.

In one aspect, the one or more identified positions of the positions along the outer perimeter of the wheel can be representative of a damaged portion of the wheel, surface damage to the wheel, one or more damaged bearings, or one or more damaged axle journals.

In one aspect, identifying a type of the damage to the wheel or the damage to the drivetrain of the vehicle can be based at least in part on a magnitude of the one or more deviations between the wheel rotational speeds and the baseline wheel rotational speed. Different types of the damage can be associated with different magnitudes of the one or more deviations between the wheel rotational speeds and the baseline wheel rotational speed.

In one aspect, the method also can include one or more of generating a warning signal to an operator of the vehicle or automatically slowing movement of the vehicle responsive to identifying the one or more of the damage to the wheel or the damage to the drivetrain of the vehicle.

In one aspect, identifying the one or more of the damage to the wheel or the damage to the drivetrain can occur responsive to correlating at least a designated, non-zero threshold number of the one or more deviations with the one or more identified positions that are within a designated spatial range of each other.

In one aspect, identifying the one or more of the damage to the wheel or the damage to the drivetrain can occur responsive to correlating at least the designated, non-zero threshold number of the one or more deviations with the one or more identified positions that are within the designated spatial range of each other during plural revolutions of the wheel.

In one aspect, identifying the one or more of the damage to the wheel or the damage to the drivetrain can include sorting the one or more deviations by the positions for plural revolutions of the wheel and identifying a group of the one or more deviations associated with the one or more identified positions that are within a designated, non-zero distance of each other along the outer perimeter of the wheel.

In one aspect, the one or more of the damage to the wheel or the damage to the drive train can be identified responsive to the group of the one or more deviations having at least a designated, non-zero number of deviations in the group.

In one aspect, identifying the one or more of the damage to the wheel or the damage to the drivetrain can include grouping the one or more deviations into plural different groups according to the positions for plural revolutions of the wheel, and selecting at least one group from the different groups as being representative of the one or more of the damage to the wheel or the damage to the drivetrain based on a comparison of numbers of the one or more deviations in the different groups.

In one aspect, the method also can include determining the one or more identified positions along the outer perimeter of the wheel by calculating a time integral of the wheel rotational speeds.

In one aspect, the method also can include determining the wheel rotational speeds based at least in part on a frequency as which signal pulses are output from a rotational speed sensor operably coupled with one or more of a motor of the vehicle or the wheel.

In another embodiment, a system (e.g., an analysis system of a vehicle) includes one or more processors configured to determine a baseline wheel rotational speed and wheel rotational speeds of a wheel of a vehicle for different positions along an outer perimeter of the wheel that contact a surface of a route. The one or more processors also can be configured to identify one or more deviations between the wheel rotational speeds and the baseline wheel rotational speed, and to correlate the one or more deviations between the wheel rotational speeds and the baseline wheel rotational speed with one or more identified positions of the positions along the outer perimeter of the wheel. The one or more processors also can be configured to identify one or more of damage to the wheel or damage to a drivetrain of the vehicle based at least in part on the one or more deviations being correlated with the one or more identified positions.

In one aspect, the one or more identified positions of the positions along the outer perimeter of the wheel can be representative of a damaged portion of the wheel, surface damage to the wheel, one or more damaged bearings, or one or more damaged axle journals.

In one aspect, the one or more processors can be configured to identify the one or more of the damage to the wheel or the damage to the drivetrain includes sorting the one or more deviations by the positions for plural revolutions of the wheel and identifying a group of the one or more deviations associated with the one or more identified positions that are within a designated, non-zero distance of each other along the outer perimeter of the wheel.

In another embodiment, a method (e.g., for monitoring a vehicle) includes determining rotational speeds of a wheel during movement of a vehicle that includes the wheel along a route, determining locations along the wheel that contact the route and that correspond to the rotational speeds that are measured, determining deviations in the rotational speeds of the wheel that exceed a baseline rotational speed of the wheel, determining one or more groups of the locations along the wheel that correspond with the deviations in the rotational speeds of the wheel, and determining damage to one or more of the wheel, a damaged portion of the wheel, or damage to a drivetrain of the vehicle based at least in part at least one of the groups of the locations including at least a designated, non-zero threshold number of the locations along the wheel that correspond with the deviations in the rotational speeds of the wheel.

In one aspect, determining the rotational speeds and determining the locations can occur over multiple revolutions of the wheel, and determining the one or more groups of the locations along the wheel can include the locations that correspond with the deviations across the multiple revolutions and that are within a designated, non-zero distance from each other along an outer perimeter of the wheel in a common group of the one or more groups.

In an embodiment, a method comprises outputting, with one or more sensors associated with a rotating examined wheel of a vehicle, one or more respective sensor signals representative of variations in rotating speeds of the examined wheel. The method further comprises determining, with one or more processors on board a vehicle, a speed signature of the rotating examined wheel of the vehicle, based on the one or more sensor signals. For example, the one or more sensors may be electrically connected to the one or more processors, for the processors to receive the one or more sensor signals from the one or more processors. The method further comprises detecting, with the one or more processors, one or more of a damaged wheel and/or drivetrain of the vehicle based at least in part on the speed signature. The method further comprises one or more of: controlling (e.g., automatically controlling) the vehicle for movement along a route based at least in part on the damaged wheel and/or drivetrain that is detected; moving the vehicle along the route to a maintenance facility based at least in part on the damaged wheel and/or drivetrain that is detected; and/or automatically scheduling the vehicle for a maintenance operation based at least in part on the damaged wheel and/or drivetrain that is detected. In another embodiment, the method further comprises, based at least in part on the damaged wheel and/or drivetrain that is detected, the maintenance operation of removing the examined wheel and/or parts of the damaged drivetrain from the vehicle and truing the wheel or otherwise repairing the wheel and/or drivetrain.

In one embodiment, a method (e.g., for monitoring a wheel) includes determining, with one or more processors onboard a vehicle, a first speed signature of a rotating examined wheel of a vehicle. The first speed signature is representative of variations in rotating speeds of the examined wheel. The method also includes comparing, with the one or more processors, the first speed signature with one or more second speed signatures of one or more second wheels, and detecting, with the one or more processors, one or more of a damaged wheel and/or drivetrain of the vehicle based at least in part on the first speed signature as compared with the one or more second speed signatures.

In one aspect, the method also includes identifying one or more waveforms from the one or more second speed signatures. Comparing the first speed signature with the one or more second speed signatures can include identifying one or more of a difference or a similarity between the first speed signature and the one or more waveforms.

In one aspect, the method also includes removing the one or more of the difference or the similarity between the first speed signature and the one or more waveforms from the first speed signature to create a filtered speed signature. Detecting the one or more of the damaged wheel and/or drivetrain can be based at least in part on the filtered speed signature.

In one aspect, identifying the one or more waveforms includes identifying one or more mother wavelets from the one or more second speed signatures.

In one aspect, the examined wheel and the one or more second wheels are included in the (same) vehicle.

In one aspect, the method also includes identifying one or more peaks in the first speed signature that are absent from the one or more second speed signatures. Detecting the one or more of the damaged wheel and/or drivetrain can occur responsive to identifying the one or more peaks that are absent from the one or more second speed signatures.

In one aspect, determining the first speed signature includes determining a first frequency spectrum of the rotating speeds of the examined wheel. Comparing the first speed signature with the one or more second speed signatures of one or more second wheels can include comparing the first frequency spectrum with one or more second frequency spectra based at least in part on the one or more second speed signatures.

In one aspect, comparing the first frequency spectrum with the one or more second frequency spectra can include identifying one or more peaks at one or more harmonic frequencies of the first frequency spectrum and determining one or more of an absence or a presence of the one or more peaks in the one or more second frequency spectra.

In another embodiment, a system (e.g., a monitoring system) includes one or more processors configured to be disposed onboard a vehicle and to determine a first speed signature of a rotating examined wheel of the vehicle. The first speed signature is representative of variations in rotating speeds of the examined wheel. The one or more processors also are configured to compare the first speed signature with one or more second speed signatures of one or more second wheels, and to detect one or more of a damaged wheel and/or drivetrain of the vehicle based at least in part on the first speed signature as compared with the one or more second speed signatures.

In one aspect, the one or more processors also are configured to identify one or more waveforms from the one or more second speed signatures, and to compare the first speed signature with the one or more second speed signatures by identifying one or more of a difference or a similarity between the first speed signature and the one or more waveforms.

In one aspect, the one or more processors are configured to remove the one or more of the difference or the similarity between the first speed signature and the one or more waveforms from the first speed signature to create a filtered speed signature. The one or more processors can be configured to detect the one or more of the damaged wheel and/or drivetrain based at least in part on the filtered speed signature.

In one aspect, the one or more processors are configured to identify the one or more waveforms by identifying one or more mother wavelets from the one or more second speed signatures.

In one aspect, the examined wheel and the one or more second wheels are included in the (same) vehicle.

In one aspect, the one or more processors also are configured to identify one or more peaks in the first speed signature that are absent from the one or more second speed signatures. The one or more processors are configured to detect the one or more of the damaged wheel and/or drivetrain responsive to identifying the one or more peaks that are absent from the one or more second speed signatures.

In one aspect, the one or more processors are configured to determine the first speed signature by determining a first frequency spectrum of the rotating speeds of the examined wheel, and to compare the first speed signature with the one or more second speed signatures of one or more second wheels by comparing the first frequency spectrum with one or more second frequency spectra based at least in part on the one or more second speed signatures.

In one aspect, the one or more processors are configured to compare the first frequency spectrum with the one or more second frequency spectra by identifying one or more peaks at one or more harmonic frequencies of the first frequency spectrum and determining one or more of an absence or a presence of the one or more peaks in the one or more second frequency spectra.

In another embodiment, a method (e.g., for monitoring a wheel) includes determining accelerations of a rotating wheel of a vehicle using one or more processors disposed onboard the vehicle, temporally correlating the accelerations of the wheel with different time periods using the one or more processors, grouping the accelerations of the wheel into different sets based at least in part on the accelerations as temporally correlated with the different time periods using the one or more processors, and identifying a damaged wheel and/or drivetrain of the vehicle based at least in part on one or more differences between the different sets of the accelerations using the one or more processors.

In one aspect, the method also includes determining the different time periods based on when different arc segments of the wheel contact a route being traveled by the vehicle.

In one aspect, the method also includes determining which of the arc segments of the wheel includes the damaged portion based at least in part on the one or more differences between the different sets of the accelerations.

In one aspect, the method also includes applying a low pass filter to the accelerations in one or more of the different sets of the accelerations. The damaged portion of the wheel is identified based at least in part on the accelerations to which the low pass filter was applied.

In one embodiment, a method (e.g., for monitoring a wheel) includes determining a speed signature of a rotating examined wheel of a vehicle. The speed signature can be representative of variations in rotating speeds of the examined wheel. The method also includes detecting one or more of a damaged wheel and/or drivetrain of a vehicle based at least in part on the speed signature.

In another aspect, the one or more of the damaged wheel and/or drivetrain are detected responsive to the speed signature of the examined wheel indicating that the examined wheel is rotating faster than one or more other wheels of the vehicle.

In another aspect, the method also includes determining a calculated speed of the examined wheel based at least in part on one or more of a diameter or radius of the examined wheel. The one or more of the damaged wheel and/or drivetrain can be detected responsive to the speed signature of the examined wheel indicating that the examined wheel is rotating faster than the calculated speed of the examined wheel.

In another aspect, detecting the one or more of the damaged wheel and/or drivetrain includes identifying one or more changes in the speeds of the examined wheel representative of the examined wheel having one or more damaged portions that contact a route.

In another aspect, the one or more changes in the speeds of the examined wheel can represent a difference between a first radius of the examined wheel in the one or more damaged portions of the examined wheel and at least a second radius of the examined wheel in one or more other portions of the examined wheel outside of the one or more flat portions.

In another aspect, the method also can include associating the rotating speeds of the examined wheel with different locations of the examined wheel in a spatial domain of the speeds. The speeds can be associated with the different locations by temporally correlating times at which the rotating speeds occur with times at which the different locations contact a route.

In another aspect, the method can include locating where on the examined wheel that one or more damaged portions are located based at least in part on when one or more increases in the speeds of the examined wheel occur.

In another aspect, the speed signature represents a frequency spectrum of the speeds, and the method also can include determining one or more speeds of one or more other wheels of the vehicle. The examined wheel can be identified as having one or more damaged portions by comparing frequency spectra of the one or more speeds of the one or more other wheels to the frequency spectrum of the speeds of the examined wheel.

In another aspect, the examined wheel can be identified as having the one or more damaged portions responsive to the frequency spectrum of the speeds of the examined wheel having one or more harmonic peaks at one or more frequencies that are based at least in part on a velocity of the vehicle that are not present in the frequency spectra of the one or more speeds of the one or more other wheels.

In another embodiment, a method (e.g., for examining a wheel) includes determining one or more of acceleration or vibration of an examined wheel of a vehicle as the examined wheel rotates during movement of the vehicle, and detecting one or more of a damaged wheel and/or drivetrain responsive to the one or more of acceleration or vibration exceeding one or more of a designated acceleration or a designated vibration.

In another aspect, determining the one or more of acceleration or vibration of the examined wheel includes monitoring one or more of vibration or impact acceleration of the examined wheel using a radio frequency identification (RFID) tag mounted to one or more of the examined wheel or a traction motor that rotates the examined wheel.

In another embodiment, a system (e.g., a monitoring system) includes one or more processors configured to determine a speed signature of a rotating examined wheel of a vehicle. The speed signature can represent variations in rotating speeds of the examined wheel. The one or more processors also can be configured to detect one or more of a damaged wheel and/or drivetrain of a vehicle based at least in part on the speed signature.

In another aspect, the one or more processors can be configured to detect the one or more of the damaged wheel and/or drivetrain responsive to the speed signature of the examined wheel indicating that the examined wheel is rotating faster than one or more other wheels of the vehicle.

In another aspect, the one or more processors can be configured to determine a calculated speed of the examined wheel based at least in part on one or more of a diameter or radius of the examined wheel. The one or more processors also can be configured to detect the one or more of the damaged wheel and/or drivetrain responsive to the speed signature of the examined wheel indicating that the examined wheel is rotating faster than the calculated speed of the examined wheel.

In another aspect, the one or more processors are configured to detect the one or more of the damaged wheel and/or drivetrain by identifying one or more changes in the speeds of the examined wheel representative of the examined wheel having one or more damaged portions that contact a route.

In another aspect, the one or more processors are configured to associate the rotating speeds of the examined wheel with different locations of the examined wheel in a spatial domain of the speeds. The speeds can be associated with the different locations by temporally correlating times at which the rotating speeds occur with times at which the different locations contact a route.

In another aspect, the speed signature represents a frequency spectrum of the speeds. The one or more processors can be configured to determine one or more speeds of one or more other wheels of the vehicle, and to identify the examined wheel as having one or more damaged portions by comparing frequency spectra of the one or more speeds of the one or more other wheels to the frequency spectrum of the speeds of the examined wheel.

In another aspect, the one or more processors are configured to identify the examined wheel as having the one or more damaged portions responsive to the frequency spectrum of the speeds of the examined wheel having one or more harmonic peaks at one or more frequencies that are based at least in part on a velocity of the vehicle that are not present in the frequency spectra of the one or more speeds of the one or more other wheels.

In another embodiment, a system (e.g., a monitoring system) includes one or more processors configured to determine one or more of acceleration or vibration of an examined wheel of a vehicle as the examined wheel rotates during movement of the vehicle. The one or more processors also can be configured to detect one or more of a damaged wheel and/or drivetrain responsive to the one or more of acceleration or vibration exceeding one or more of a designated acceleration or a designated vibration.

In another aspect, the one or more processors are configured to determine the one or more of acceleration or vibration of the examined wheel by monitoring one or more of vibration or impact acceleration of the examined wheel using a radio frequency identification (RFID) tag mounted to one or more of the examined wheel or a traction motor that rotates the examined wheel.

In one example of the inventive subject matter described herein, a monitoring method includes detecting at least one of a damaged wheel and/or drivetrain of a vehicle with one or more onboard or off-board technologies by determining a speed signature of the wheel in a frequency domain that includes at least one of a once-per-revolution or harmonic frequencies of the wheel having increased amounts of variation in speeds of the wheel.

In another example of the inventive subject matter described herein, another monitoring method includes detecting at least one of a damaged wheel and/or drivetrain of a vehicle with one or more onboard or off-board technologies by determining a speed signature of the examined wheel that represents the examined wheel spinning faster than one or more other wheels of the vehicle or spinning faster than a calculated speed of the examined wheel. The calculated speed of the examined wheel can be calculated from a previously measured diameter or radius of the examined wheel.

In another example of the inventive subject matter described herein, another monitoring method includes detecting at least one of a damaged wheel and/or drivetrain of a vehicle with one or more onboard or off-board technologies by measuring accelerations or vibrations in the examined wheel that exceed one or more designated accelerations or vibrations of the examined wheel.

In another example of the inventive subject matter described herein, another monitoring method includes detecting at least one of a damaged wheel and/or drivetrain of a vehicle with one or more onboard or off-board technologies by monitoring at least one of vibration or impact acceleration of the examined wheel using a radio frequency identification (RFID) tag mounted to a combination of the examined wheel and a traction motor that generates tractive effort to rotate the examined wheel.

In one aspect, the method also can include communicating an alert when the at least one of the vibration or impact acceleration of the examined wheel exceeds a designated threshold.

In another example of the inventive subject matter described herein, a monitoring system includes an analysis system configured to detect at least one of a damaged wheel and/or drivetrain of a vehicle with one or more onboard or off-board technologies by determining a speed signature of the wheel in a frequency domain that includes at least one of a once-per-revolution or harmonic frequencies of the wheel having increased amounts of variation in speeds of the wheel.

In another example of the inventive subject matter described herein, a monitoring system includes an analysis system configured to detect at least one of a damaged wheel and/or drivetrain of a vehicle with one or more onboard or off-board technologies by determining a speed signature of the examined wheel that represents the examined wheel spinning faster than one or more other wheels of the vehicle or spinning faster than a calculated speed of the examined wheel. The calculated speed of the examined wheel can be calculated from a previously measured diameter or radius of the examined wheel.

In another example of the inventive subject matter described herein, a monitoring system includes an analysis system configured to detect at least one of a damaged wheel and/or drivetrain of a vehicle with one or more onboard or off-board technologies by measuring accelerations or vibrations in the examined wheel that exceed one or more designated accelerations or vibrations of the examined wheel.

In another example of the inventive subject matter described herein, a monitoring system includes an analysis system configured to detect at least one of a damaged wheel and/or drivetrain of a vehicle with one or more onboard or off-board technologies by monitoring at least one of vibration or impact acceleration of the examined wheel using a radio frequency identification (RFID) tag mounted to a combination of the examined wheel and a traction motor that generates tractive effort to rotate the examined wheel.

In one aspect, the analysis system can be configured to communicate an alert when the at least one of the vibration or impact acceleration of the examined wheel exceeds a designated threshold.

In another example of the inventive subject matter described herein, a monitoring method includes measuring speeds of an examined wheel of a vehicle as the vehicle moves along a route, identifying one or more changes in the speeds of the examined wheel, and identifying the examined wheel as having one or more damaged portions along an outer perimeter of the examined wheel that contacts the route responsive to the one or more changes in the speeds of the examined wheel being identified.

In one aspect, the one or more changes in the speeds of the examined wheel that are identified represent a difference between a first radius of the examined wheel in the one or more damaged portions along the outer perimeter of the examined wheel and at least a second radius of the examined wheel in one or more other portions along the outer perimeter of the examined wheel that are outside of the one or more damaged portions.

In one aspect, the one or more changes in the speeds of the examined wheel that are identified represent a reduction in a radius of the examined wheel in the one or more damaged portions of the examined wheel relative to the radius of the examined wheel in one or more other portions that are outside of the one or more damaged portions of the examined wheel.

In one aspect, the method also includes associating the speeds of the examined wheel with different locations of the examined wheel along the outer perimeter of the examined wheel in a spatial domain analysis of the speeds. The speeds can be associated with the different locations by temporally correlating times at which the speeds are measured with times at which the different locations are in contact with the route.

In one aspect, the method also includes at least one of applying a low pass filter to the speeds associated with the different locations or calculating at least one of an average or median of the speeds associated with the different locations, wherein the one or more damaged portions are identified by at least one of examining the speeds after application of the low pass filter or the at least one of an average or median of the speeds.

In one aspect, the examined wheel can be identified as having the one or more damaged portions when one or more of the different locations along the outer perimeter of the wheel are associated with larger changes in the speeds of the examined wheel than one or more other locations along the outer perimeter of the wheel.

In one aspect, the method also can include locating where along the outer perimeter of the examined wheel that the one or more damaged portions are located based on when one or more increases in the speeds of the examined wheel occur. This locating where the damaged portions are along the wheel can take into account changes in the speed at which a motor rotates the wheel.

In one aspect, the one or more changes in the speeds of the examined wheel are identified by determining a periodic increase in rotational speeds of the examined wheel.

In one aspect, the one or more changes in the speeds of the examined wheel are identified by locating harmonic peaks in a frequency spectrum of the speeds of the examined wheel.

In one aspect, the harmonic peaks are located at frequencies of the frequency spectrum that are integer multiples of a frequency at which a motor rotates at least one of the examined wheel or an axle of the vehicle to which the examined wheel is coupled.

In one aspect, the method also includes measuring one or more speeds of one or more other wheels of the vehicle as the vehicle moves along the route. The examined wheel can be identified as having the one or more damaged portions by comparing frequency spectra of the one or more speeds of the one or more other wheels to a frequency spectrum of the speeds of the examined wheel.

In one aspect, the examined wheel can be identified as having the one or more damaged portions responsive to the frequency spectrum of the speeds of the examined wheel having one or more harmonic peaks at one or more frequencies that are based on a velocity of the vehicle that are not present in the frequency spectra of the one or more speeds of the one or more other wheels.

In one aspect, the method also can include selecting a mother wavelet from a previously designated set of wavelets and convoluting the mother wavelet into a speed signature of the examined wheel to generate a de-noised speed signature of the examined wheel. The speed signature can represent the speeds of the examined wheel over at least one of a time period during which the speeds were measured or a frequency spectrum of the speeds. The examined wheel can be identified as having the one or more damaged portions along the outer perimeter of the examined wheel responsive to the de-noised speed signature having one or more peaks representative of increases in the speeds of the examined wheel.

In another example of the inventive subject matter described herein, a monitoring system includes an analysis system configured to obtain speeds of an examined wheel of a vehicle as the vehicle moves along a route. The analysis system also is configured to identify one or more changes in the speeds of the examined wheel and to identify the examined wheel as having one or more damaged portions along an outer perimeter of the examined wheel that contacts the route responsive to the one or more changes in the speeds of the examined wheel being identified.

In one aspect, the analysis system includes one or more hardware circuits that at least one of include or are connected with one or more processors.

In one aspect, the monitoring system also includes a speed sensor configured to measure the speeds of the examined wheel.

In one aspect, the one or more changes in the speeds of the examined wheel are identified by the analysis system as representing a difference between a first radius of the examined wheel in the one or more damaged portions along the outer perimeter of the examined wheel and at least a second radius of the examined wheel in one or more other portions along the outer perimeter of the examined wheel that are outside of the one or more damaged portions.

In one aspect, the one or more changes in the speeds of the examined wheel that are identified by the analysis system as representing a reduction in a radius of the examined wheel in the one or more damaged portions of the examined wheel relative to the radius of the examined wheel in one or more other portions that are outside of the one or more damaged portions of the examined wheel.

In one aspect, the analysis system is further configured to determine times at which the speeds of the examined wheel are measured and to determine times during which different locations of the examined wheel along the outer perimeter of the examined wheel are in contact with the route. The analysis system also can be configured to temporally correlate the changes in the speeds with the different locations of the wheel by at least one of associating or matching the times at which the speeds of the examined wheel are measured with the times during which the different locations of the examined wheel are in contact with the route.

In one aspect, the analysis system is further configured to identify the examined wheel as having the one or more damaged portions when one or more of the different locations along the outer perimeter of the wheel are associated with larger changes in the speeds of the examined wheel than one or more other locations along the outer perimeter of the wheel.

In one aspect, the analysis system also is configured to identify the one or more changes in the speeds of the examined wheel by identifying a periodic increase in rotational speeds of the examined wheel.

In one aspect, the analysis system is further configured to identify the one or more changes in the speeds of the examined wheel by locating harmonic peaks in a frequency spectrum of the speeds of the examined wheel.

In one aspect, the analysis system also is configured to identify the one or more changes in the speeds of the examined wheel by locating the harmonic peaks at frequencies of the frequency spectrum that are integer multiples of a frequency at which a motor rotates at least one of the examined wheel or an axle of the vehicle to which the examined wheel is coupled.

In one aspect, the analysis system also is configured to obtain one or more speeds of one or more other wheels of the vehicle as the vehicle moves along the route. The analysis system is further configured to identify the examined wheel as having the one or more damaged portions by comparing frequency spectra of the one or more speeds of the one or more other wheels to a frequency spectrum of the speeds of the examined wheel.

In one aspect, the analysis system is configured to identify the examined wheel as having the one or more damaged portions responsive to the frequency spectrum of the speeds of the examined wheel having one or more harmonic peaks at one or more frequencies that are based on a velocity of the vehicle that are not present in the frequency spectra of the one or more speeds of the one or more other wheels.

Multiple instances of "one or more processors" does not mean the systems are embodied in different processors, although that is a possibility. Instead, the one or more processors of the systems described herein may be the same as the one or more processors of the same or different system, such that in one embodiment, different systems can be embodied in the same processor or the same multiple processors.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the generation and/or analysis of the speed signatures may take into account a large amount of factors, may rely on relatively complex computations, and the like, such that such a person cannot complete the analysis of the speed signatures within a commercially reasonable time period.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single or multiple pieces of hardware (for example, electronic circuits and/or circuitry that include and/or are connected with one or more processors, microcontrollers, random access memories, hard disks, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
   determining first rotational speeds of a wheel of a vehicle using a rotational speed sensor;
   determining a baseline wheel rotational speed of the wheel, the baseline wheel rotational speed representing one or more of an average or filtered rotational speed of the wheel based on second rotational speeds of the wheel that previously were measured;
   identifying one or more differences between the first rotational speeds and the baseline wheel rotational speed;
   correlating the one or more differences between the first rotational speeds and the baseline wheel rotational speed with different segments of an outer perimeter of the wheel by temporally matching when the first rotational speeds associated with the one or more differences were measured and when the different segments of the outer perimeter of the wheel were in contact with a route on which the vehicle is moving;
   identifying one or more of damage to the wheel or damage to a drivetrain of the vehicle based at least in part on the one or more differences being correlated with the one or more segments of the outer perimeter of the wheel; and
   changing movement of the vehicle responsive to identifying the one or more of the damage to the wheel or the damage to the drivetrain.

2. The method of claim 1, wherein one or more of identifying the one or more differences, correlating the one or more differences with the one or more identified segments, or identifying the one or more of damage to the wheel or damage to the drivetrain occurs during the movement of the vehicle.

3. The method of claim 1, wherein identifying the one or more differences includes determining one or more of a peak of the first rotational speeds, a median of the first rotational speeds, an average of the first rotational speeds, or a root mean square of the first rotational speeds, wherein the one or more differences exceed the one or more of the peak, the median, the average, or the root mean square to the first rotational speeds by at least a designated threshold.

4. The method of claim 1, wherein determining the first rotational speeds occurs for more than one revolution of the wheel over the route.

5. The method of claim 1, further comprising receiving a position signal output from a motor that is operably coupled with the wheel, wherein temporally matching the first rotational speeds with the different segments of the outer perimeter includes dividing the position signal output by the motor by a gear ratio of one or more components that interconnect the motor with the wheel.

6. The method of claim 1, wherein at least one of the segments along the outer perimeter of the wheel is representative of a flat portion of the wheel, surface damage to the wheel, one or more damaged bearings, or one or more damaged axle journals.

7. The method of claim 6, further comprising identifying a type of the damage to the wheel or the damage to the drivetrain of the vehicle from among two or more different types of damage based at least in part on a magnitude of the one or more differences between the first rotational speeds and the baseline wheel rotational speed, wherein the different types of the damage are associated with different magnitudes of the one or more differences between the first rotational speeds and the baseline wheel rotational speed.

8. The method of claim 1, further comprising one or more of generating a warning signal to an operator of the vehicle or automatically slowing the movement of the vehicle responsive to identifying the one or more of the damage to the wheel or the damage to the drivetrain of the vehicle.

9. The method of claim 1, wherein identifying the one or more of the damage to the wheel or the damage to the drivetrain occurs responsive to correlating at least a designated, non-zero threshold number of the one or more differences with the one or more segments of the outer perimeter of the wheel that are within a designated spatial range of each other.

10. The method of claim 9, wherein identifying the one or more of the damage to the wheel or the damage to the drivetrain occurs responsive to correlating at least the designated, non-zero threshold number of the one or more differences with the one or more segments of the outer perimeter of the wheel that are within the designated spatial range of each other during plural revolutions of the wheel.

11. The method of claim 1, wherein identifying the one or more of the damage to the wheel or the damage to the drivetrain includes sorting the one or more differences by the segments of the outer perimeter of the wheel for plural revolutions of the wheel and identifying a group of the one or more differences associated with the one or more segments of the outer perimeter of the wheel that are within a designated, non-zero distance of each other along the outer perimeter of the wheel.

12. The method of claim 11, wherein the one or more of the damage to the wheel or the damage to the drive train is identified responsive to the group of the one or more differences having at least a designated, non-zero number of differences in the group.

13. The method of claim 1, wherein identifying the one or more of the damage to the wheel or the damage to the drivetrain includes:
grouping the one or more differences into plural different groups according to which of the segments of the outer perimeter of the wheel are associated with the one or more differences for plural revolutions of the wheel; and
selecting at least one group from the different groups as being representative of the one or more of the damage to the wheel or the damage to the drivetrain based on a comparison of numbers of the one or more differences in the different groups.

14. The method of claim 1, further comprising determining the one or more segments along the outer perimeter of the wheel by calculating a time integral of the first rotational speeds.

15. The method of claim 1, further comprising determining the first rotational speeds based at least in part on a frequency as which signal pulses are output from the rotational speed sensor operably coupled with one or more of a motor of the vehicle or the wheel.

16. A system comprising:
one or more processors configured to receive first rotational speeds of a wheel of a vehicle from a rotational speed sensor, the one or more processors configured to determine a baseline wheel rotational speed of the wheel, the baseline wheel rotational speed representing one or more of an average or a filtered rotational speed of the wheel based on second rotational speeds of the wheel that were previously measured, the one or more processors also configured to identify one or more differences between the first rotational speeds and the baseline wheel rotational speed, and to correlate the one or more differences between the first rotational speeds and the baseline wheel rotational speed with different segments of an outer perimeter of the wheel by temporally matching when the first rotational speeds associated with the one or more differences were measured and when the different segments of the outer perimeter of the wheel were in contact with a route on which the vehicle is moving,
wherein the one or more processors also are configured to identify one or more of damage to the wheel or damage to a drivetrain of the vehicle based at least in part on the one or more differences being correlated with the one or more identified segments of the outer perimeter of the wheel,
wherein the one or more processors also are configured to change movement of the vehicle responsive to identifying the one or more of the damage to the wheel or the damage to the drivetrain.

17. The system of claim 16, wherein the one or more segments of the outer perimeter of the wheel are representative of a flat portion of the wheel, surface damage to the wheel, one or more damaged bearings, or one or more damaged axle journals.

18. The system of claim 16, wherein the one or more processors are configured to identify the one or more of the damage to the wheel or the damage to the drivetrain includes sorting the one or more differences by the segments along the outer perimeter of the wheel for plural revolutions of the wheel and identifying a group of the one or more differences associated with the one or more segments along the outer perimeter of the wheel that are within a designated, non-zero distance of each other along the outer perimeter of the wheel.

19. A method comprising:
determining rotational speeds of a wheel during movement of a vehicle that includes the wheel along a route;
determining different locations along the wheel that contact the route as the rotational speeds are measured;
determining one or more of the rotational speeds of the wheel that exceed a baseline rotational speed of the wheel;
determining one or more groups of the locations along the wheel that correspond with the one or more rotational speeds of the wheel that exceed the baseline rotational speed;
determining one or more of damage to the wheel, a flat portion of the wheel, or damage to a drivetrain of the vehicle based at least in part at least one of the groups of the locations including at least a designated, non-zero threshold number of the locations along the wheel that correspond with the one or more rotational speeds of the wheel that exceed the baseline rotational speed; and changing movement of the vehicle responsive to determining the one or more of damage to the wheel, the flat portion, or the damage to the drivetrain.

20. The method of claim 19, wherein determining the rotational speeds and determining the different locations occurs over multiple revolutions of the wheel, and wherein determining the one or more groups of the locations along the wheel includes the locations that correspond with the one or more rotational speeds that exceed the baseline rotational speed across the multiple revolutions and that are within a designated, non-zero distance from each other along an outer perimeter of the wheel in a common group of the one or more groups.

* * * * *